United States Patent
Indiresan et al.

(10) Patent No.: US 11,818,044 B2
(45) Date of Patent: *Nov. 14, 2023

(54) PATH SIGNATURES FOR DATA FLOWS

(71) Applicant: Cisco Technology, Inc., San Jose, CA (US)

(72) Inventors: Atri Indiresan, Sunnyvale, CA (US); Frank Brockners, Cologne (DE); Shwetha Subray Bhandari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/377,047

(22) Filed: Jul. 15, 2021

(65) Prior Publication Data

US 2021/0344598 A1 Nov. 4, 2021

Related U.S. Application Data

(63) Continuation of application No. 16/661,540, filed on Oct. 23, 2019, now Pat. No. 11,102,121.

(51) Int. Cl.
*H04W 72/04* (2023.01)
*H04L 45/7453* (2022.01)
*H04L 41/0695* (2022.01)
*H04L 47/2483* (2022.01)
*H04L 61/5007* (2022.01)

(52) U.S. Cl.
CPC ...... *H04L 45/7453* (2013.01); *H04L 41/0695* (2013.01); *H04L 47/2483* (2013.01); *H04L 61/5007* (2022.05)

(58) Field of Classification Search
CPC ............. H04L 45/7453; H04L 41/0695; H04L 47/2483; H04L 61/5007; H04L 61/2007; H04L 29/06; H04L 63/06; H04L 63/10; H04W 72/1215; H04W 72/0446; H04W 72/042

See application file for complete search history.

(56) References Cited

U.S. PATENT DOCUMENTS 7,831,822 B2 * 11/2010 Yoon .................... H04L 67/14
713/153
2011/0286326 A1 11/2011 Awano
(Continued)

FOREIGN PATENT DOCUMENTS

WO WO2017141081 A1 8/2017

OTHER PUBLICATIONS

Office Action for U.S. Appl. No. 16/661,540, dated Jan. 13, 2021, Indiresan, "Path Signatures for Data Flows," 9 pages.
(Continued)

*Primary Examiner* — Wei Zhao
(74) *Attorney, Agent, or Firm* — Lee & Hayes, P.C.

(57) ABSTRACT

This disclosure describes various methods, systems, and devices related to identifying path changes of data flows in a network. An example method includes receiving, at a node, a packet including a first value. The method further includes generating a second value by inputting the first value and one or more node details into a hash function. The method includes replacing the first value with the second value in the packet. The packet including the second value is forwarded by the node.

17 Claims, 14 Drawing Sheets

(56) References Cited

U.S. PATENT DOCUMENTS

| | | | |
|---|---|---|---|
| 2016/0021000 A1 | 1/2016 | Previdi et al. | |
| 2017/0079026 A1* | 3/2017 | Li et al. | |
| 2017/0230252 A1* | 8/2017 | Khasnabish | H04L 43/18 |
| 2017/0331670 A1* | 11/2017 | Parkvall | H04J 11/0056 |
| 2018/0367518 A1* | 12/2018 | Singh | H04L 63/06 |
| 2019/0132297 A1* | 5/2019 | Ammanur | H04L 69/22 |
| 2021/0126864 A1 | 4/2021 | Indiresan et al. | |

OTHER PUBLICATIONS

PCT Search Report and Written Opinion dtaed Dec. 15, 2020 for PCT Application No. PCT/US2020/056915, 14 pages.

\* cited by examiner

| Entry | Flow Identifier | Count | Last Packet Time | Path Signature |
|---|---|---|---|---|
| #1 | Flow Identifier 1 | Count 1 | Timestamp 1 | Signature 1 |
| #2 | Flow Identifier 2 | Count 2 | Timestamp 2 | Signature 2 |
| #3 | Flow Identifier 3 | Count 3 | Timestamp 3 | Signature 3 |
| #4 | Flow Identifier 4 | Count 4 | Timestamp 4 | Signature 4 |
| #5 | Flow Identifier 5 | Count 5 | Timestamp 5 | Signature 5 |
| #6 | Flow Identifier 6 | Count 6 | Timestamp 6 | Signature 6 |
| #7 | Flow Identifier 7 | Count 7 | Timestamp 7 | Signature 7 |
| #8 | Flow Identifier 8 | Count 8 | Timestamp 8 | Signature 8 |
| #9 | Flow Identifier 9 | Count 9 | Timestamp 9 | Signature 9 |
| #10 | Flow Identifier 10 | Count 10 | Timestamp 10 | Signature 10 |

FIG. 6A

| Entry | Flow Identifier | Time | Path Signature |
|---|---|---|---|
| #1 | Flow Identifier 1 | Timestamp A | Signature A |
| | Flow Identifier 1 | Timestamp B | Signature A |
| | Flow Identifier 1 | Timestamp C | Signature A |
| | Flow Identifier 1 | Timestamp D | Signature A |
| | Flow Identifier 1 | Timestamp E | Signature A |
| | Flow Identifier 1 | Timestamp F | Signature B |
| | Flow Identifier 1 | Timestamp G | Signature B |
| | Flow Identifier 1 | Timestamp H | Signature B |
| | Flow Identifier 1 | Timestamp I | Signature B |
| | Flow Identifier 1 | Timestamp J | Signature B |

← PATH CHANGE

FIG. 6B

PATH SIGNATURES FOR DATA FLOWS

CROSS-REFERENCE TO RELATED APPLICATIONS

This application claims the priority of U.S. application Ser. No. 16/661,540, filed on Oct. 23, 2019, which incorporated by reference herein in its entirety.

TECHNICAL FIELD

The present disclosure relates generally to generating path signatures for data flows through networks and to diagnosing problems with networks based on path signatures.

BACKGROUND

Data can be transmitted through a network from a source to a destination in the form of a unidirectional data flow. The data flow may include multiple data packets that are propagated through the network from the source to the destination. The order at which the data packets are transmitted from the source may be an order in which the data packets are supposed to be consumed by the destination. For instance, a content server may transmit a data packets in a video stream in an order corresponding to the progression of the video, such that packets corresponding to the beginning of the video are transmitted first and packets corresponding to the end of the video are transmitted later.

Various modern network topologies may include a variety of nodes by which information can be transmitted. Individual nodes in a network can be connected to more than two other nodes in the network. Due to node interconnectivity, there may be multiple paths through the network between any two endpoints. Individual nodes can select appropriate paths based on various conditions of the network. For instance, a node can select between multiple paths based on load balancing, connectivity, or the like.

However, if data packets in the same data flow are transmitted along different paths through the network, the data packets may arrive at the destination in a different order than they were intended to be consumed. For instance, one packet may be transmitted through a node with high latency and another packet may be transmitted through a node with lower latency. Out-of-Order (OoO) data packets can negatively impact Quality of Service (QoS) for end-users. To avoid OoO data packets in a data flow, there is a need to identify whether packets in a particular data flow travel through different paths in the network.

In-situ Operations, Administration, and Management (IOAM) provides mechanisms by which each node transferring a data packet through a network can add metadata to the data packet. In some cases, this metadata can be used to derive the path through which the data packet travels through the network. However, IOAM metadata can significantly increase the size of a given data packet. IOAM metadata may add a significant level of data (e.g., 100 bytes) to a given data packet at each hop through the network. The size of IOAM metadata can be unacceptable in various networks, particularly when the data packet traverses a large number of nodes on its way to a destination. For instance, in various networks, nodes may lack the hardware required to support IOAM as well as to support transferring data packets with IOAM metadata. Some alternatives to IOAM, such as In-Network Telemetry (INT), Inband Flow Analyzer (IFA), and In-situ Flow Information Telemetry (IFIT), suffer from similar deficiencies.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6A illustrates an example of a flow table with various entries corresponding to different flows through a particular node.

FIG. 6B illustrates an example of a flow table with various entries corresponding to different path signatures of packets in a flow, which corresponds to different paths taken by packets of that flow.

DESCRIPTION OF EXAMPLE EMBODIMENTS

Overview

Figure 1:
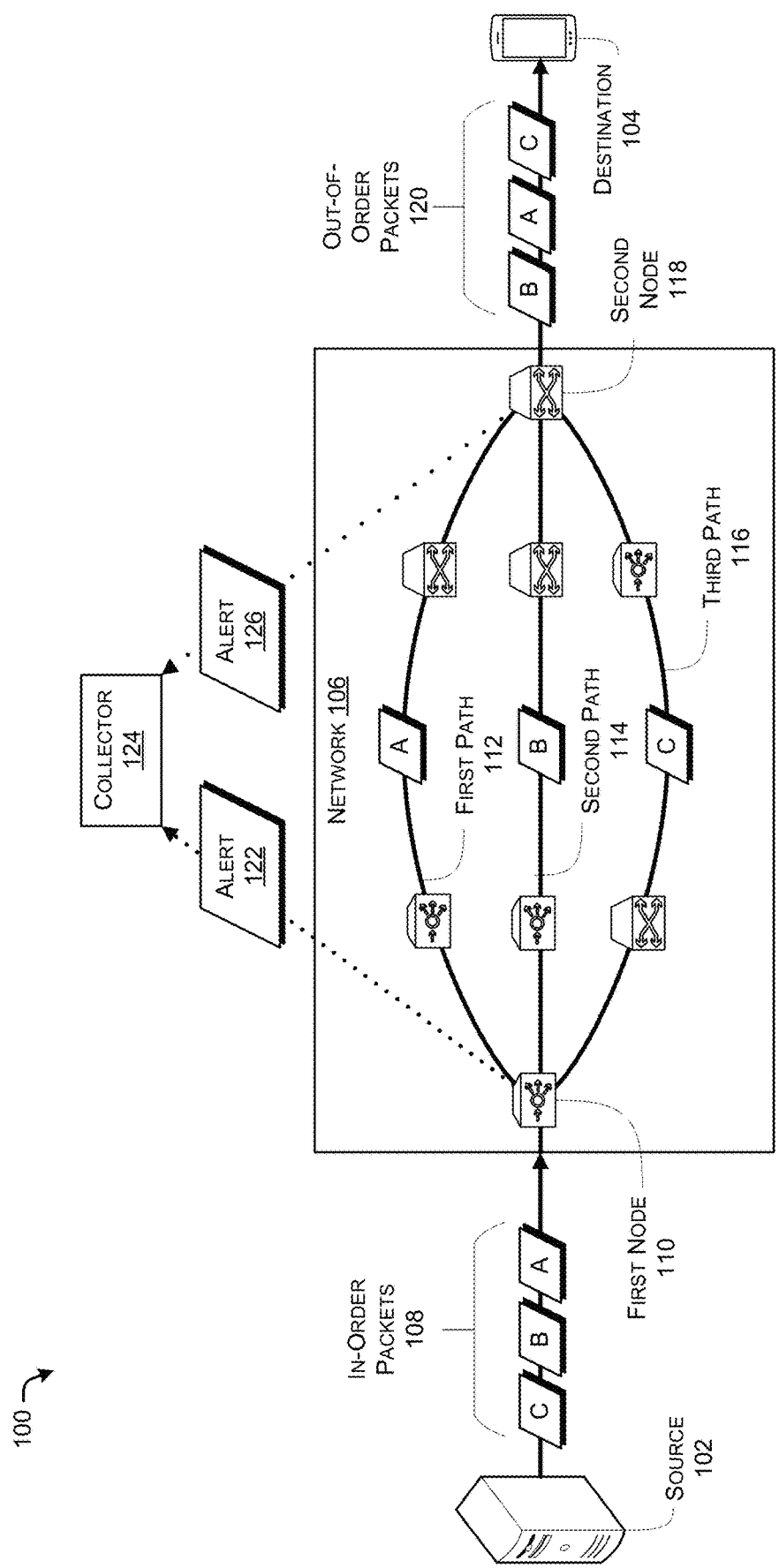
FIG. 1 illustrates an example environment in which packets of a flow are transmitted through different paths in a network.

This disclosure describes various techniques for generating and utilizing in-situ path signatures for data flows traversing networks. A path signature can be generated by a network node for a particular data packet in a data flow that is traversing the network node. The path signature can represent a unique path that the data packet has traversed to arrive at the network node. When the network node identifies that different data packets in the same data flow have different path signatures, the network node can trigger an alert indicating that the packets in the data flow may be out-of-order and/or there may be a problem with the network resulting in the out-of-order packets. The network node may be a physical device, server, switch, or the like.

In various implementations, the techniques described herein may be performed by a system and/or device having non-transitory computer-readable media storing computer-executable instructions that, when executed by one or more processors, performs the methods described herein.

An example method includes receiving, at a node, a packet including a first value; generating a second value by inputting the first value and data associated with the node into a hash function; replacing the first value with the second value in the packet; and forwarding, by the node, the packet including the second value. According to some examples, replacing the first value with the second value includes replacing the first value in a data field having a fixed size with the second value, the data field including at least one of an In-situ OAM (IOAM) field, an In-Network Telemetry (INT) field, an Inband Flow Analyzer (IFA) field, or an In-situ Flow Information Telemetry (IFIT) field.

In some cases, a size of the first value is equivalent to a size of the second value. In particular examples, each of the size of the first value and the size of the second value is 32 bits or 64 bits. In some implementations, the first value is a first signature and the second value is a second signature.

In various cases, the example method further includes receiving, at the node, a second packet including a third value; identifying that the third value is different than the first value; and based on identifying that the third value is different than the first value, transmitting an alert to a network manager. In some implementations, the example method further includes receiving, at the node, a second packet including a third value; generating a fourth value by inputting the third value and the data associated with the node into the hash function; identifying that the fourth value is different than the second value; and based on identifying that the fourth value is different than the second value, transmitting an alert to a network manager. In some cases, the node is a first node, the packet is forwarded to a second node, and the second node identifies that the fourth value is different than the second value. According to some examples, wherein a size of the first value is equivalent to a size of the third value.

Example Embodiments

Various implementations of the present disclosure relate to identifying a path through which a data packet is transferred through a network. Particular implementations provide a path signature data field in the data packet, which can be modified by individual nodes through which the data packet is transferred.

In some implementations, a node may receive a data packet with an existing path signature. The node may input the existing path signature, as well as other information based on the node itself, into a hash function that may return a revised path signature. The node may replace the existing path signature with the revised path signature in the data packet before forwarding the data packet to another node in the network. The revised path signature may represent the unique path that the data packet has traversed up to the node itself.

In particular cases, a node or some other device may track path signatures corresponding to data packets in the same data flow. If the node identifies a change in path signatures in the data flow, the node may transmit an alert to a collector. The collector may diagnose a problem in the network based on the alert and/or other alerts corresponding to the data flow from other nodes in the network. In some cases, the path signature may be tracked as part of an existing NetFlow functionality.

Unlike IOAM metadata, the path signature data field can have a fixed size regardless of the number of nodes through which the data packet is transferred. For instance, the path signature data field can be limited to 32- or 64-bits. Because the path signature can have a relatively small size, the path signature can be readily implemented in existing network node hardware.

Various implementations described herein provide particular improvements to the field of computer networking. The path signature can enable in-situ network path tracking for individual data flows as the data flows are being transmitted through the network. Accordingly, problems within the network can be efficiently diagnosed in real-time.

Various implementations of the present disclosure will be described in detail with reference to the drawings, wherein like reference numerals present like parts and assemblies throughout the several views. Additionally, any samples set forth in this specification are not intended to be limiting and merely set forth some of the many possible implementations.

FIG. 1 illustrates an example environment 100 in which packets of a flow are transmitted through different paths. In FIG. 1, data plane transmissions are depicted with solid arrows and control plane transmissions are depicted with dotted arrows.

As illustrated in FIG. 1, a source 102 may transmit data to a destination 104 via a network 106. The source 102 and the destination 104 may each be examples of nodes. As used herein, the terms "node," "network node," and their equivalents, can refer to any entity within a network that can transmit packets to and/or receive packets from at least one other node. A node may be a device, a software instance, a Virtual Machine (VM), or the like. In some examples, a node can be a client, a server, or a combination thereof. In some cases, a node can be an endpoint of a flow, such as the source 102 or the destination 104. The source 102 may be, for example, a content server. The destination 104, for example, may be a User Equipment (UE).

The source 102 may transmit the data in a flow that includes in-order packets 108. As used herein, the terms "flow," "data flow," "traffic flow," "packet flow," and their equivalents, can refer to multiple packets transmitted from a source to a destination. In some examples, a flow may include packets that share at least one of the same ingress interface (e.g., SNMP ifIndex), source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)). As used herein, the terms "packet," "data packet," and their equivalents, can refer to a unit of data that is transmitted between two nodes. In various examples, a packet may have a header, which may include control data, and a payload, which may include user data. The header may include information such as an identifier of the source of the packet, an identifier of the destination of the packet, an indication of the type of user data in the payload, or the like. In some cases, a packet can be defined by a particular networking protocol, such as IP, TCP, UDP, or another networking protocol.

As used herein, the term "port," and its equivalents, can refer to a component of a node configured to connect the rest of the node to an interface. A node may have a fixed set of ports that can be selectively connected to particular interfaces. Each port of a node may have a unique identity, which may be represented by a port number. As used herein, the terms "ingress port," "entry port," and their equivalents, can refer to a port at which a packet enters a node. As used herein, the terms "egress port," "exit port," and their equivalents, can refer to a port at which a packet exits a node.

As illustrated in FIG. 1, the in-order packets 108 are labeled and transmitted from the source 102 in the order of "A," "B," and "C." The in-order packets 108 may consecutively reach a first node 110 in the network 106. The first node 110 may forward the packets along different paths through the network 106, including a first path 112, a second path 114, and a third path 116. The first node 110 may forward the packets along the different paths based on various factors. For instance, the first node 110 may include a load balancer than may identify that the first path 112 is the most uncongested path when packet "A" is received but may identify that the second path 114 is the most uncongested path when packet "B" is received. In some cases, the first node 110 may identify that the second path 114 is connected when packet "B" is received, but is disconnected when packet "C" is received, and may therefore select the third path 116 for packet "C" rather than the second path 114. In particular implementations, a problem with the network (e.g., a problem causing the congestion or disconnection) may cause the first node 110 to forward the packets along the different paths.

As used herein, the terms "path," "network path," and their equivalents, can refer to a specific sequence of nodes and/or interfaces over which a packet can traverse. A path may be defined between two nodes. In some cases, a path of a packet transmitted from a first node to a second node may be defined according to an identity of the first node, an identity of the second node, as well as any sequence of intermediary nodes and/or interfaces over which the packet travels from the first node to the second node.

As used herein, the term "interface," and its equivalents, can refer to a connection between two nodes in a network. In some cases, an interface may directly connect the two nodes and/or may omit any intermediary nodes. An interface may be connected to a first port of a first device and to a second port of a second device. In some cases, an interface between two nodes can be a wired interface, such that a packet can be transmitted as a signal conducted through a solid medium (e.g., an Ethernet cable, a fiber-optic cable, etc.) connecting the two nodes. In some examples, an interface between nodes can be a wireless interface, such that a packet can be transmitted as a signal through a fluid medium (e.g., air, water, etc.) connecting the two nodes. A wireless interface may be defined according to a type of wave used to carry the signal (e.g., a sound wave, an electromagnetic wave, etc.) and a frequency of the wave (e.g., an ultrasonic frequency, a radio frequency, an infrared frequency, etc.). An interface may be further defined according to a particular communication protocol, which may indicate how data transmitted over the interface is modulated. Some examples of communication protocols applicable to this application include TCP/IP, Wi-Fi, Bluetooth, or the like.

As illustrated in FIG. 1, the first path 112, the second path 114, and the third path 116 may converge to a second node 118, which may forward the packets to the destination 104. However, due to the differences between the first path 112, the second path 114, and the third path 116, the second node 118 may forward the packets as Out-of-Order (OoO) packets 120 to the destination 104. Even though the in-order packets 108 were transmitted in the order of "A," "B," and "C," the OoO packets 120 are received at the destination 104 in the order of "C," "A," and "B."

In various implementations, the first node 110 and the second node 118 may generate path signatures for the packets and amend the packets with the path signatures. As used herein, the terms "signature," "path signature," and their equivalents, can refer to a unique identifier of a path that a packet has traversed or is traversing. A path signature can be generated by a node, such as the first node 110 or the second node 118, for a given packet based at least one of an identifier of the node 110 or 118, an ingress port at which the packet is received by the node 110 or 118, or an egress packet at which the packet is forwarded from the node 110 or 118. The node 110 or 118 can further include the generated path signature in the given packet and forward the packet with the generated path signature toward the destination 104.

In some cases, a revised path signature can be further generated based on a previous path signature. For example, the second node 118 may receive a given packet with a path signature generated from the first node 110, and/or any intermediary nodes through which the packet has traveled between the first node 110 and the second node 118 and may use the previous path signature to generate a revised path signature for the given packet. Accordingly, in some implementations, the path signature of a packet can be revised recursively as the path travels through the network 106.

According to various implementations of the present disclosure, the first node 110 and the second node 118 may identify that the packets are being transmitted over different paths through the network 106. For instance, the first node 110 may forward the packets from different ports and may generate different path signatures for the different packets based on the different ports. The first node 110 may identify that the path signatures are different, and in response, may transmit an alert 122 to a collector 124 indicating that the flow is being transmitted along different paths through the network 106. In some examples, the second node 118 may receive the packets in different ports and may generate different path signatures for the packets due to the different ports. In certain implementations, the second node 118 may receive the packets with different previous path signatures and may generate revised path signatures based on the different previous path signatures. The second node 118 may identify that the path signatures (e.g., generated, received, or revised) corresponding to the packets are different.

In response to identifying that the path signatures for the different packets in the flow are different, the first node 110 may generate and transmit an alert 122 to a collector 124. Similarly, in response to identifying that the path signatures for the different packets in the flow are different, the second node 118 may generate and transmit an alert 126 to the collector 124.

In some examples, the second node 118 may receive the packets with different path signatures due to the first path 112, the second path 114, and the third path 116. The second node 118 may receive the packets at different ports and may generate different path signatures for the packets due to the different existing path signatures and/or the different ports at which the packets are received. The second node 118 may identify that the path signatures of the as-received packets are different, and/or that the path signatures of the as-transmitted packets are different, and in response, transmit an alert 126 to the collector 124 indicating that the flow is being transmitted along different paths through the network 106.

In particular implementations, the collector 124 may identify that there is a problem with the network 106 based on the alerts 122 and 126. In some cases, the collector 124 may identify that the alert 122 is received from an upstream node (i.e., the first node 110) and that the alert 126 is received from a downstream node (i.e., the second node 118). The collector 124 may therefore identify that the problem is associated with the first node 110, rather than the second node 118. Once the problem is identified, the problem can be resolved by an administrator of the network 106.

Figure 2:
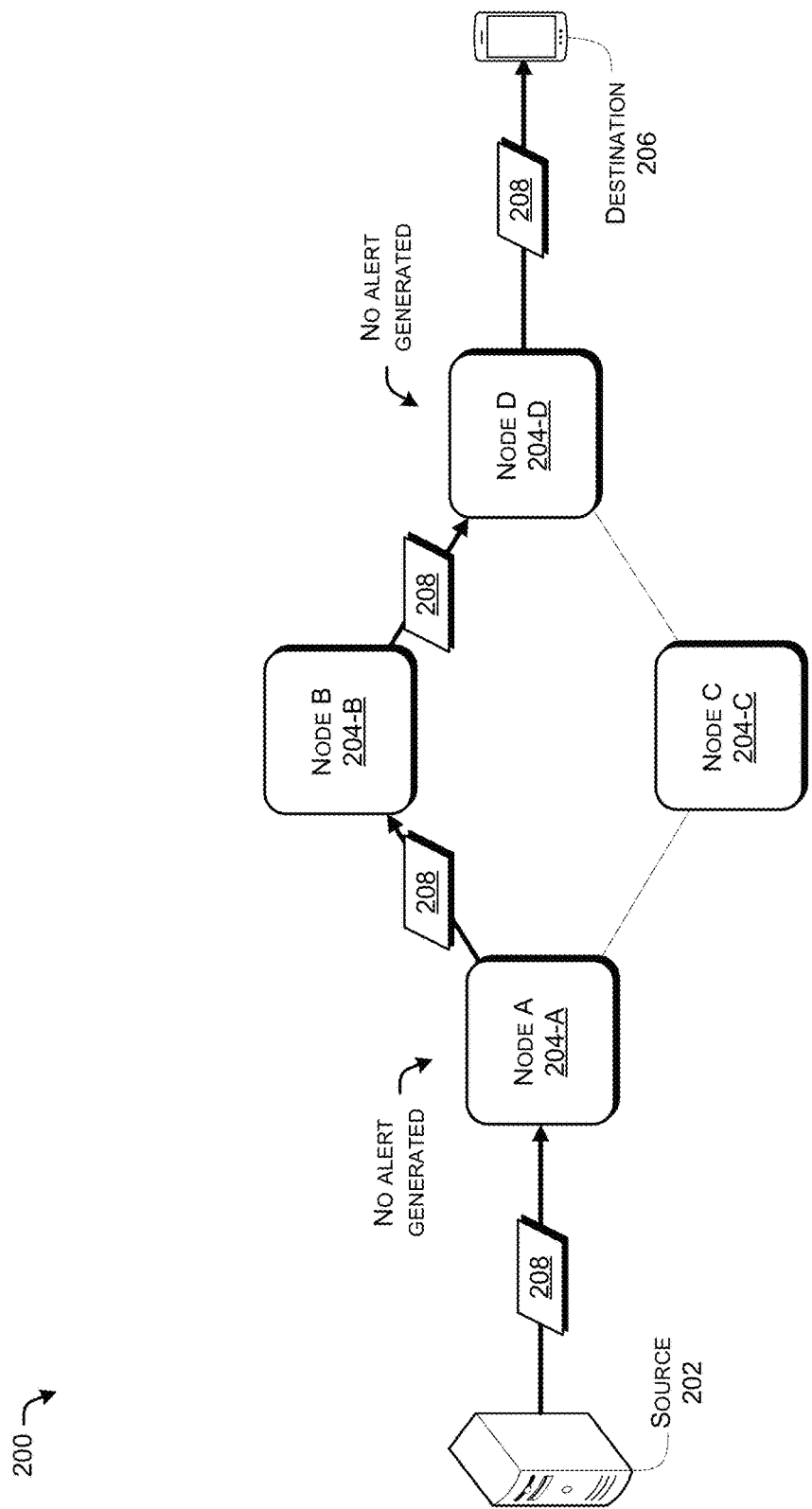
FIG. 2 illustrates an example environment in which a first packet of a flow is transmitted through a first path in a network.

FIG. 2 illustrates an example environment 200 in which a packet of a flow is transmitted through a first path in a network without the network generating an alert.

A source 202 may be transmitting the flow through a network including a node A 204-A, node B 204-B, node C 204-C, and node D 204-D. A destination 206 may receive the flow after it has been transmitted through the network. The network may have multiple layers of nodes. For instance, Node A 204-A is in a first layer, Node B 204-B and Node C 204-C are in a second layer, and Node D 204-D is in a third layer.

As illustrated in FIG. 2, the flow includes a first packet 208. As illustrated in FIG. 2, the first packet 208 may be transmitted from the source 202 to Node A 204-A. Node A 204-A may generate a path signature for the first packet 208 and may forward the first packet 208 with the path signature to Node B 204-B. In examples in which the first packet 208 includes a previous path signature when it is received by Node A 204-A, Node A 204-A may generate a new path signature based, at least in part, on the previous path signature. In instances in which the first packet 208 does not include a previous path signature, Node A 204-A may rely on other factors to generate the path signature. In various implementations, Node A 204-A may generate the path signature based on any of various factors associated with Node A 204-A and/or how the first packet 208 is routed through Node A 204-A. In various implementations, the first packet 208 can carry a path signature as metadata encapsulated in a header. For instance, the first packet 208 may carry the path signature encapsulated in an IP (e.g., IPv4 or IPv6) header of the first packet 208, for example, in an IP option (e.g., IPv4), an extension header (e.g., IPv6), or the like. In some cases, the first packet 208 may include an Ethernet frame, and the path signature may be included in a payload of the Ethernet frame and may be identified by an EtherType field of the Ethernet frame. In some examples, the path signature can be included in the first packet 208 in at least one of a Network Service Header (NSH), a Geneve header, a Virtual Extensible Local Area Network (VXLAN)-Generic Protocol Extension (GPE) header, a Segment Routing over IPv6 (SRv6) header, a Multiprotocol Label Switching (MPLS) header, or the like. In some examples, the path signature can be encapsulated in at least one of IOAM, INT, IFA, or IFIT metadata.

In various implementations, Node A 204-A may identify that the flow has not changed paths based on the path signature that Node A 204-A has generated for the first packet 208. In some cases, the first packet 208 may be the initial packet that Node A 204-A has received in the flow. In some situations, the path signature that Node A 204-A has generated for the first packet 208 may be the same as a path signature that Node A 204-A has previously generated for a previous packet that Node A 204-A has received and forwarded in the flow. Because Node A 204-A has not identified a path change in the flow, Node A 204-A may refrain from generating an alert associated with the flow.

The first packet 208 with the path signature generated by Node A 204-A may be transmitted from Node A 204-A to Node B 204-B. In some cases, Node B 204-B may forward the first packet 208 to Node D 204-D without modifying or updating the path signature in the first packet 208. However, in some implementations, Node B 204-B may generate its own path signature for the first packet 208 and may forward the first packet 208 with the path signature to Node B 204-B. Node B 204-B may generate its new path signature iteratively based, at least in part, on the previous path signature generated by Node A 204-A. In various implementations, Node B 204-B may generate its new path signature based on any of various factors associated with Node B 204-B and/or how the first packet 208 is routed through Node B 204-B.

In various implementations, Node B 204-B may identify that the flow has not changed paths based on the path signature that Node A 204-A has generated for the first packet 208 and/or the path signature that Node B 204-B has generated for the first packet 208. In some cases, the first packet 208 may be the initial packet that Node B 204-B has received in the flow. In some situations, the path signature that Node B 204-B has generated for the first packet 208 may be the same as a path signature that Node B 204-B has previously generated for a previous packet that Node B 204-B has received (from Node A 204-A) and forwarded in the flow. Because Node B 204-B has not identified a path change in the flow, Node B 204-B may refrain from generating an alert associated with the flow.

The first packet 208 with the path signature generated by Node A 204-A or Node B 204-B may be transmitted from Node B 204-B to Node D 204-D. In various implementations, Node D 204-D may generate its own path signature for the first packet 208 and may forward the first packet 208 with the path signature to the destination 206. Node D 204-D may generate its new path signature iteratively based, at least in part, on the previous path signature in the first packet 208 as-received by Node D 204-D, which may be the path signature generated by Node A 204-A or Node B 204-B. In various implementations, Node D 204-D may generate its new path signature based on any of various factors associated with Node D 204-D and/or how the first packet 208 is routed through Node D 204-D.

In various implementations, Node D 204-D may identify that the flow has not changed paths based on the path signature that Node D 204-D has generated for the first packet 208. In some cases, the first packet 208 may be the initial packet that Node D 204-D has received in the flow. In some situations, the path signature that Node D 204-D has generated for the first packet 208 may be the same as a path signature that Node D 204-D has previously generated for a previous packet that Node D 204-D has received (from Node A 204-A and Node B 204-B) and forwarded in the flow. Because Node D 204-D has not identified a path change in the flow, Node D 204-D may refrain from generating an alert associated with the flow.

Figure 3:
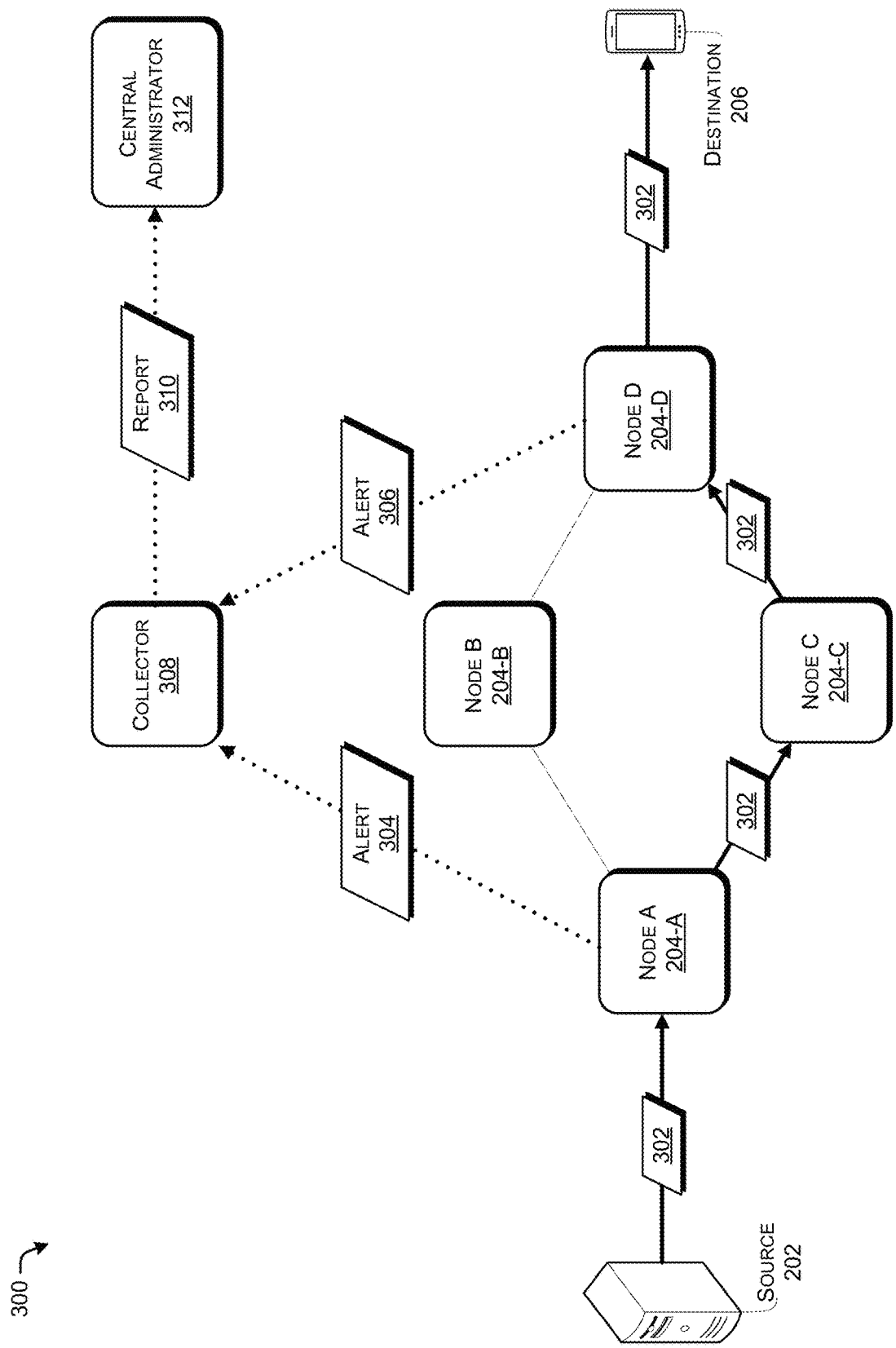
FIG. 3 illustrates an example environment in which a second packet of the flow is transmitted through a second path in the network.

FIG. 3 illustrates an example environment 300 in which a subsequent packet of the flow is transmitted through a second path in the network. The flow discussed with reference to FIG. 3 may be the same flow discussed above with respect to FIG. 2.

As illustrated in FIG. 3, the flow includes a second packet 302. Like the first packet 208, the second packet 302 may be transmitted from the source 202 to node A 204-A. Node A 204-A may generate a path signature for the second packet 302. However, unlike the first packet 208, Node A 204-A may forward the second packet 302 with the path signature to Node C 204-C. In examples in which the second packet 302 includes a previous path signature when it is received by Node A 204-A, Node A 204-A may generate a new path signature based, at least in part, on the previous path signature. In instances in which the second packet 302 does not include a previous path signature, Node A 204-A may rely on other factors to generate the path signature. In various implementations, Node A 204-A may generate the path signature based on any of various factors associated with Node A 204-A and/or how the second packet 302 is routed through Node A 204-A.

In various implementations in which Node A 204-A generates the path signature of the second packet 302 based on how the second packet 302 is routed through Node A 204-A, the path signature that Node A 204-A generates for the second packet 302 may be different than the path signature that Node A 204-A generates for the first packet 209. Specifically, Node A 204-A may generate the path signature for the first packet 208 based on routing the first packet 208 to Node B 204-B and may generate the path signature for the second packet 302 based on routing the second packet 302 to Node C 204-C. Based on the different path signatures generated for the first packet 208 and the second packet 302, Node A 204-A may identify that the flow has changed paths. In response to identifying the path change, Node A 204-A may generate an alert 304 and transmit the alert 304 to a collector 308. The alert 304 may identify the flow that has changed paths, a time at which the flow has changed paths, Node A 204-A, or the like.

In various implementations, the second packet 302 can carry a path signature as metadata encapsulated in a header. For instance, the second packet 302 may carry the path signature encapsulated in an IP (e.g., IPv4 or IPv6) header of the first packet 208, for example, in an IP option (e.g., IPv4), an extension header (e.g., IPv6), or the like. In some cases, the second packet 302 may include an Ethernet frame, and the path signature may be included in a payload of the Ethernet frame and may be identified by an EtherType field of the Ethernet frame. In some examples, the path signature can be included in the second packet 302 in at least one of a Network Service Header (NSH), a Geneve header, a Virtual Extensible Local Area Network (VXLAN)-Generic Protocol Extension (GPE) header, a Segment Routing over IPv6 (SRv6) header, a Multiprotocol Label Switching (MPLS) header, or the like. In some examples, the path signature can be encapsulated in at least one of IOAM, INT, IFA, or IFIT metadata.

The second packet 302 with the path signature generated by Node A 204-A may be transmitted from Node A 204-A to Node C 204-C. In some cases, Node C 204-C may forward the second packet 302 to Node D 204-D without modifying or updating the path signature in the second packet 302. However, in some implementations, Node C 204-C may generate its own path signature for the second packet 302 and may forward the second packet 302 with the path signature to Node D 204-D. Node C 204-C may generate its new path signature iteratively based, at least in part, on the previous path signature generated by Node A 204-A. In various implementations, Node C 204-C may generate its new path signature based on any of various factors associated with Node C 204-C and/or how the second packet 302 is routed through Node C 204-C.

In various implementations, Node C 204-C may not identify that the flow has changed paths. For instance, the second packet 302 may be the first packet that Node C 204-C has received in the flow. Because Node C 204-C has not identified a path change in the flow, Node C 204-C may refrain from generating an alert associated with the flow.

The second packet 302 with the path signature generated by Node A 204-A or Node C 204-C may be transmitted from Node C 204-C to Node D 204-D. In various implementations, Node C 204-C may generate its own path signature for the second packet 302 and may forward the second packet 302 with the path signature to the destination 206. Node D 204-D may generate its new path signature iteratively based, at least in part, on the previous path signature in the second packet 302 as-received by Node D 204-D, which may be the path signature generated by Node A 204-A or Node C 204-C.

In various implementations, Node D 204-D may generate its new path signature based on any of various factors associated with Node D 204-D and/or how the second packet 302 is routed through Node D 204-D. In various examples, the path signature generated by Node D 204-D for the second packet 302 may be different than the path signature generated by Node D 204-D for the first packet 208.

In various implementations, Node D 204-D may identify that the flow has changed paths based on the path signature that Node D 204-D has generated for the first packet 208 and the path signature that Node D 204-D has generated for the second packet 302. In response to identifying the path change, Node D 204-D may transmit an alert 306 to the collector 308. The alert 306 may identify the flow that has changed paths, a time at which the flow has changed paths, Node D 204-D, or the like.

The collector 308 may identify a problem with the network based on the alert 304 from Node A 204-A and the alert 306 from Node D 204-D. In some cases, the collector 308 may assume that any problem with a network causing a change in path signatures will result in a change in path signatures along all nodes downstream of the problem. Accordingly, despite receiving the alerts 304 and 306 from both Node A 204-A and Node D 204-D, the collector 308 may identify that the problem with the network is associated with Node A 204-A, rather than Node D 204-D.

In response to identifying the problem with the network, the collector 308 may transmit a report 310 to a central administrator 312. The report 310 may identify information about the problem, such as the node (e.g., Node A 304-A) associated with the problem, a time at which the problem is identified, or the like. The central administrator 312 may initiate a process by which the problem can be resolved.

Figure 4A:
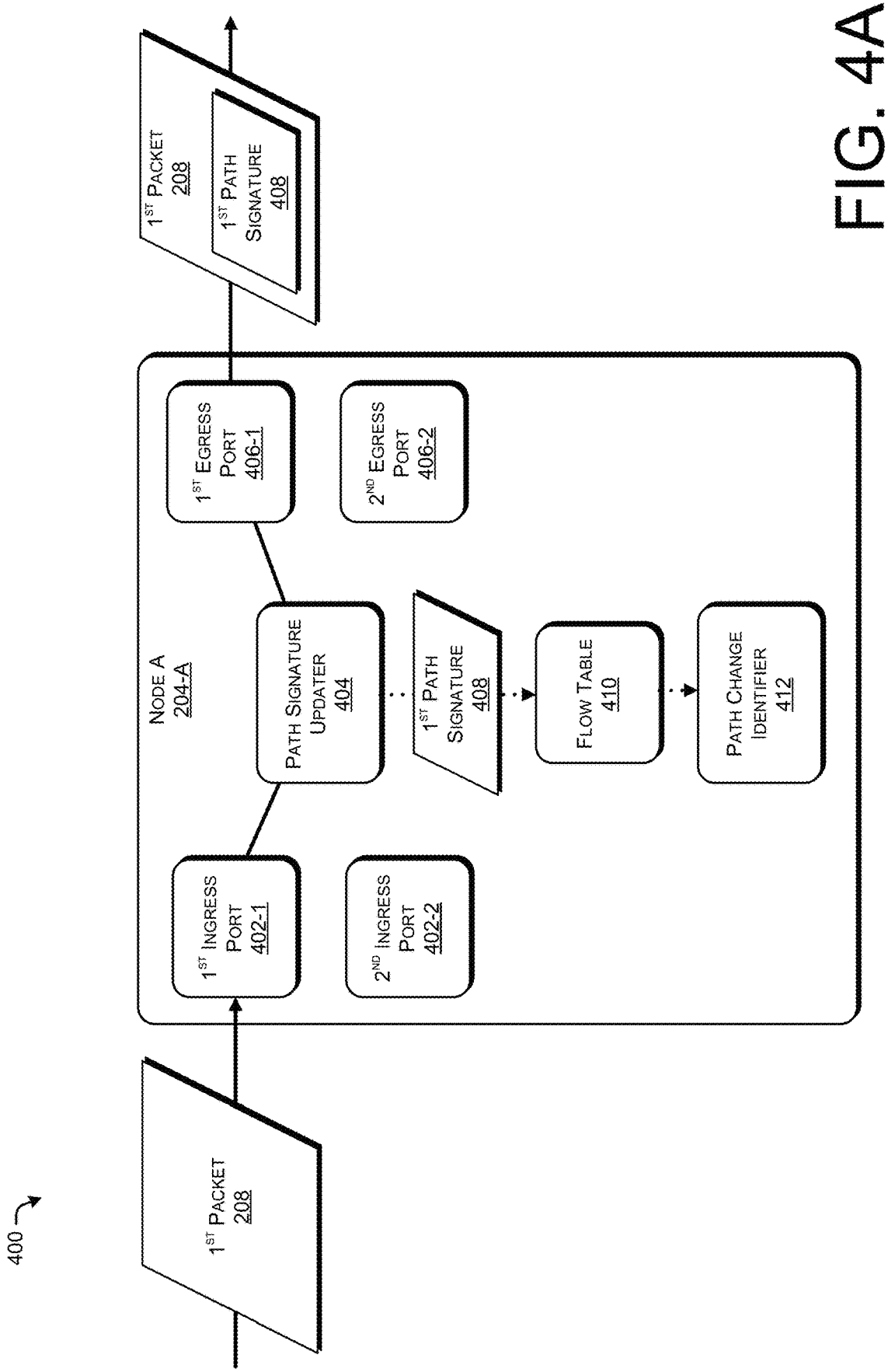
FIGS. 4A and 4B illustrate example environments of a node forwarding packets of a flow with path signatures.

FIG. 4A illustrates an example environment 400 of a node forwarding the first packet of the flow with a path signature. In particular, FIG. 4A illustrates an example of Node A 204-A forwarding the first packet 208.

As shown in FIG. 4A, Node A 204-A receives the first packet 208. In FIG. 4A, Node A 204-A may receive the first packet 208 without a path signature. Node A 204-A receives the first packet 208 at a first ingress port 402-1. In particular implementations, Node A 204-A includes multiple ingress ports, such as the first ingress port 402-1 and the second ingress port 402-2. Each one of the ingress ports in Node A 204-A (i.e., each of the first ingress port 402-1 and the second ingress port 402-2) may be associated with a unique identifier that distinguishes the ingress port from the other ingress ports in Node A 204-A. A port number is one example of an identifier of an ingress port.

In the example illustrated in FIG. 4A, a path signature updater 404 intercepts the first packet 208. The path signature updater 404, or some other component of Node A 204-A, selects an appropriate egress port among a first egress port 406-1 and a second egress port 406-2. Each one of the egress ports in Node A 204-A (i.e., each of the first egress port 406-1 and the second egress port 406-2) may be associated with a unique identifier that distinguishes the egress port from the other egress ports in Node A 204-A. A port number is one example of an identifier of an egress port. In the example of FIG. 4, the first egress port 406-1 has been selected.

Based on various information, such as at least one of an identifier of the first ingress port 402-1 at which the first packet 208 is received, an identifier of the first egress port 406-1 at which the first packet 208 will be forwarded, an identifier of Node A 204-A itself, or the like, the path signature updater 404 generates a first path signature 408 for the first packet 208. An example of an identifier of Node A 204-A can include a unique identification number associated with Node A 204-A.

In particular implementations, the path signature updater 404 uses a hash function to generate the first path signature 408. The hash function may return a unique value in response to a unique input. Accordingly, as long as the input to the hash function is indicative of the unique path of a particular packet through a network, the hash function will return a value unique to the path. In some examples, the hash function used by the path signature updater 404 is a cryptographic hash function, an XOR function, CRC32, or the like. For instance, in various device-centric implementations, the path signature updater 404 can use the following Formula 1 to generate the first path signature 408:

$$S_0 = \text{Hash}(P_i, P_e, N_1) \qquad \text{Formula 1}$$

wherein $S_0$ is the path signature (e.g., the first path signature 408 generated by Node A 204-A), Hash( ) is a hash function, $P_i$ is the identifier of an ingress port (e.g., the first ingress port 402-1) at which the packet (e.g., the first packet 208) is received, $P_e$ is the identifier of the egress port (e.g., the first egress port 406-1) from which the packet is forwarded, and $N_1$ is the identifier of the node (e.g., Node A 204-A). According to some examples, the path signature updater 404 may use the following Formula 2 to generate the first path signature 408:

$$S_0 = \text{Hash}(P_e, N_1) \qquad \text{Formula 2}$$

wherein $S_0$ is the path signature (e.g., the first path signature 408 generated by Node A 204-A), Hash( ) is a hash function, $P_e$ is the identifier of the egress port (e.g., the first egress port 406-1) from which the packet (e.g., the first packet 208) is forwarded, and $N_1$ is the identifier of the node (e.g., Node A 204-A). In some lightweight implementations, the path signature updater 406 uses the following Formula 3 to generate the second path signature 410:

$$S_0 = \text{Hash}(N_1) \qquad \text{Formula 3}$$

wherein $S_0$ is the path signature (e.g., the first path signature 408 generated by Node A 204-A), Hash( ) is a hash function, and $N_1$ is the identifier of the node (e.g., Node A 204-A).

In particular flow-centric implementations, the path signature updater 404 can use the following Formula 4 to generate a unique identifier of a flow:

$$f = \text{Hash}(I_S, I_D, P_S, P_D, \text{Pro}) \qquad \text{Formula 4}$$

wherein f is the identifier of the flow, Hash( ) is a hash function, $I_S$ is an identifier of a source of the flow (e.g., an IP address of the source of data packets in the flow), $I_D$ is an identifier of a destination of the flow (e.g., an IP address of the destination of data packets in the flow), $P_S$ is an identifier of a port of the source (e.g., a port number), $P_D$ is an identifier of a port of the destination (e.g., a port number), and Pro is an identifier of the protocol associated with the flow (e.g., a protocol indicating the type of data transferred in the flow). In some cases, various elements of the hash function of Formula 4 can be omitted. For instance, a 3-tuple hash function utilizing $I_S$, $I_D$, and Pro as inputs could be used to uniquely identify the flow.

In various cases, the path signature updater 404 can use the identifier of the flow calculated in Formula 4 to generate the path signature using the following Formula 5:

$$S_0 = \text{Hash}(P_i, P_e, f, N_1) \qquad \text{Formula 5}$$

wherein $S_0$ is the path signature (e.g., the first path signature 408 generated by Node A 204-A), Hash( ) is a hash function, $P_i$ is the identifier of an ingress port (e.g., the first ingress port 402-1) at which the packet (e.g., the first packet 208) is received, $P_e$ is the identifier of the egress port (e.g., the first egress port 406-1) from which the packet is forwarded, f is the identifier of the flow (e.g., generated using Formula 4), and $N_1$ is the identifier of the node (e.g., Node A 204-A). According to some examples, the path signature updater 404 may use the following Formula 6 to generate the first path signature 408:

$$S_0 = \text{Hash}(P_e, f, N_1) \qquad \text{Formula 6}$$

wherein $S_0$ is the path signature (e.g., the first path signature 408 generated by Node A 204-A), Hash( ) is a hash function, $P_e$ is the identifier of the egress port (e.g., the first egress port 406-1) from which the packet (e.g., the first packet 208) is forwarded, f is the identifier of the flow (e.g., generated using Formula 4), and $N_1$ is the identifier of the node (e.g., Node A 204-A). In some lightweight implementations, the path signature updater 406 uses the following Formula 7 to generate the second path signature 410:

$$S_0 = \text{Hash}(f, N_1) \qquad \text{Formula 7}$$

wherein $S_0$ is the path signature (e.g., the first path signature 408 generated by Node A 204-A), Hash( ) is a hash function, f is the identifier of the flow (e.g., generated using Formula 4), and $N_1$ is the identifier of the node (e.g., Node A 204-A).

Regardless of the formula used by the path signature updater 404, the first path signature 408 may uniquely represent the path of the first packet 208 through Node A 204-A. In examples in which the path signature updater 404 utilizes Formula 1, 2, 6, or 7, the first path signature 408 may further identify a path including Node B 204-B, to which the first packet 208 is forwarded using the first egress port 406-1.

The path signature updater 404 add the first path signature 408 to the first packet 208. In some examples, the path signature updater 404 adds the first path signature 408 to a header of the first packet 208. For instance, the path signature updater 404 may insert a Path Signature field into the first packet 208 and populate the Path Signature field with the first path signature 408. In some cases, the Path Signature field is included in a header field (e.g., an IP header, an IPv4 option, an IPv6 extension header, an NSH header, a Geneve header, a VXLAN-GPE header, an SRv6 header, or an MPLS header) and/or included in a payload (e.g., as identified by an EtherType). In some examples, the Path Signature field is included in at least one of IOAM, INT, IFA, or IFIT metadata. According to particular implementations, the Path Signature field has a fixed size. For instance, the Path Signature field has a fixed size of 32 bits, 64 bits, or the like. Accordingly, in various implementations, every path signature generated by the path signature updater 404 (e.g., the first path signature 408) will have the same fixed size as the Path Signature field.

The path signature updater 404 may further forward the first packet 208, with the first path signature 408, through the first egress port 406-1. The first egress port 406-1 may be connected to an interface connected to another node in the same network as Node A 204-A. For instance, as illustrated in FIG. 2, the first packet 208 can be forwarded to Node B 204-B from the first egress port 406-1.

As illustrated in FIG. 4A, the path signature updater 404 further stores the first path signature 408 in a flow table 410. In some cases, the flow table 410 includes multiple entries corresponding to different packets received and forwarded by Node A 204-A. For instance, the flow table 410 may include an entry corresponding to the first packet 208 that includes the first path signature 408. In some cases, the entries also identify the flows of the different packets received and forwarded by Node A 204-A. For example, the entry corresponding to the first packet 208 may also include information identifying the flow that includes the first packet 208.

Node A 204-A further includes a path change identifier 412, in various implementations. The path change identifier 412 may be configured to access the flow table 410 in order to determine whether packets in a particular flow have different paths. In some examples, the path change identifier 412 may determine that the first path signature 408 corresponds to the initial path signature generated by the path signature updater 404 for the flow and may therefore assume that no path change has occurred for the flow. In some instances, the path change identifier 412 may determine that the first path signature 408 matches a previous path signature generated by the path signature updater 404 for the flow and may therefore assume that no path change has occurred for the flow. When the path change identifier 412 determines that no path change has occurred, the path change identifier 412 may refrain from generating an alert.

Figure 4B:
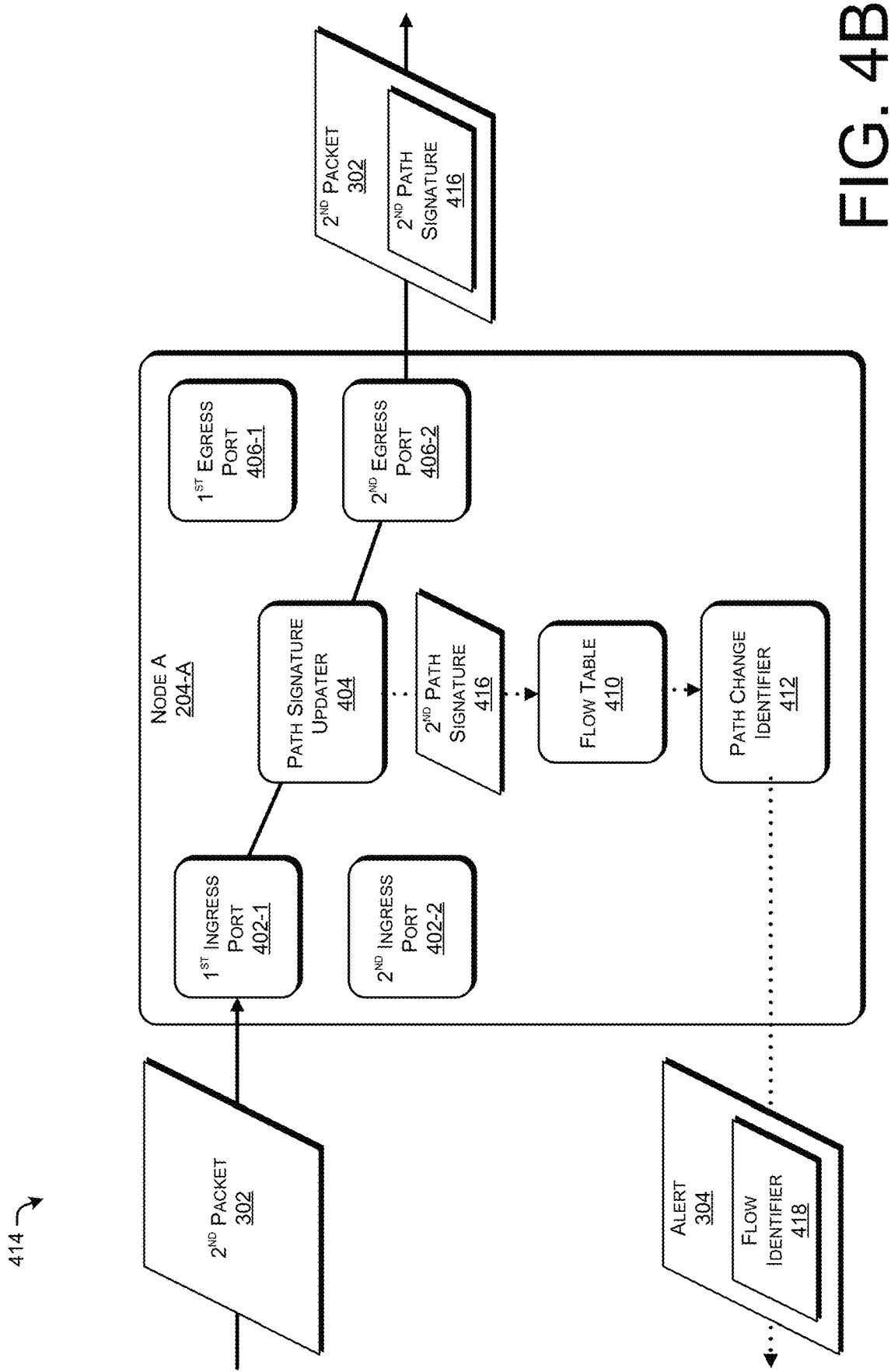

FIG. 4B illustrates an example environment 414 of a node forwarding another packet of the flow with a path signature. In particular, FIG. 4B illustrates an example of Node A 204-A forwarding the second packet 302.

As shown in FIG. 4B, Node A 204-A receives the second packet 302 without a path signature. Node A 204-A receives the second packet 302 at the first ingress port 402-1. The path signature updater 404 intercepts the second packet 302.

The path signature updater 404, or some other component of Node A 204-A, can select an appropriate egress port among a first egress port 406-1 and a second egress port 406-2 for the second packet 302. However, Node A 204-A may select the second egress port 406-2 for the second packet 302, in contrast to the first egress port 406-1 selected for the first packet 208. Node A 204-A may select the second egress port 406-2 for any of a variety of reasons. For instance, Node A 204-A may identify that the interface connected to the first egress port 406-1, or the node connected to the interface (i.e., Node B 204-B) has been disconnected since the first packet 208 was forwarded. In some examples, Node A 204-A may include a load balancer that identifies that a load associated with the first egress port 406-1 exceeds a load associated with the second egress port 406-2. For instance, the node connected to the first egress port 406-1 (i.e., Node B 204-B) may be more congested and/or associated with a higher latency than the node connected to the second egress port 406-2 (i.e., Node C 204-C).

Based on various information, such as at least one of an identifier of the first ingress port 402-1 at which the second packet 302 is received, an identifier of the second egress port 408-2 at which the second packet 302 will be forwarded, an identifier of Node A 204-A itself, or the like, the path signature updater 404 generates a second path signature 416 for the second packet 302.

In particular implementations, the path signature updater 404 uses one of Formulas 1, 2, 5, or 6 to generate the first path signature 408 and the second path signature 416. Accordingly, the first path signature 408 may be generated based on the identifier of the first egress port 406-1 and the second path signature 416 may be generated based on the identifier of the second egress port 406-2. For at least this reason, the second path signature 416 may be different than the first path signature 408.

The path signature updater 404 add the second path signature 416 to the second packet 302. In some examples, the path signature updater 404 adds the second path signature 416 to a header of the second packet 302. For instance, the path signature updater 404 may insert a Path Signature field into the second packet 302 and populate the Path Signature field with the second path signature 416. In some cases, the second path signature 416 may have the same size as the first path signature 408.

The path signature updater 404 may further forward the second packet 302, with the second path signature 416, through the second egress port 406-2. The second egress port 406-2 may be connected to an interface connected to another node in the same network as Node A 204-A. For instance, as illustrated in FIG. 3, the second packet 302 can be forwarded to Node C 204-C from the second egress port 406-2.

As illustrated in FIG. 4B, the path signature updater 404 further stores the second path signature 416 in the flow table 410. In some cases, the flow table 410 may already have stored a first entry corresponding to the first packet 208 that includes the first path signature 408. The flow table may further store a second entry corresponding to the second packet 302 that includes the second path signature 416. In some cases, the first and second entries corresponding to the first packet 208 and the second packet 302 may also include information identifying the flow that includes the first packet 208 and the second packet 302.

The path change identifier 412 may determine that the second path signature 416 stored in the second entry of the flow table 410, is different than the first path signature 408, which is stored in the first entry of the flow table 410. Based on this difference, the path change identifier 412 may determine that there is a path change in the flow. In some cases, the path change identifier 412 may determine that greater than a threshold number of packets with the first path signature 408 and/or greater than the threshold number of packets with the second path signature 416 have been received, and in response, identify that there is a persistent path change in the flow. In response to determining that there is the path change, the path change identifier 412 may generate and transmit the alert 304 from Node A 204-A. The alert 304 may indicate the path change in the flow. As illustrated in the example of FIG. 4B, the alert 304 includes a flow identifier 418. The flow identifier 418 may indicate the flow including the first packet 208 and the second packet 302. For instance, the flow identifier 418 may include at least one element of a 5-tuple associated with the flow, such as a source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)) of the first packet 208 and the second packet 302. In examples in which the alert 304 is transmitted to a collector (e.g., the collector 310), the flow identifier 418 may be used to identify a problem in the network that has led to the path change.

Figure 5A:
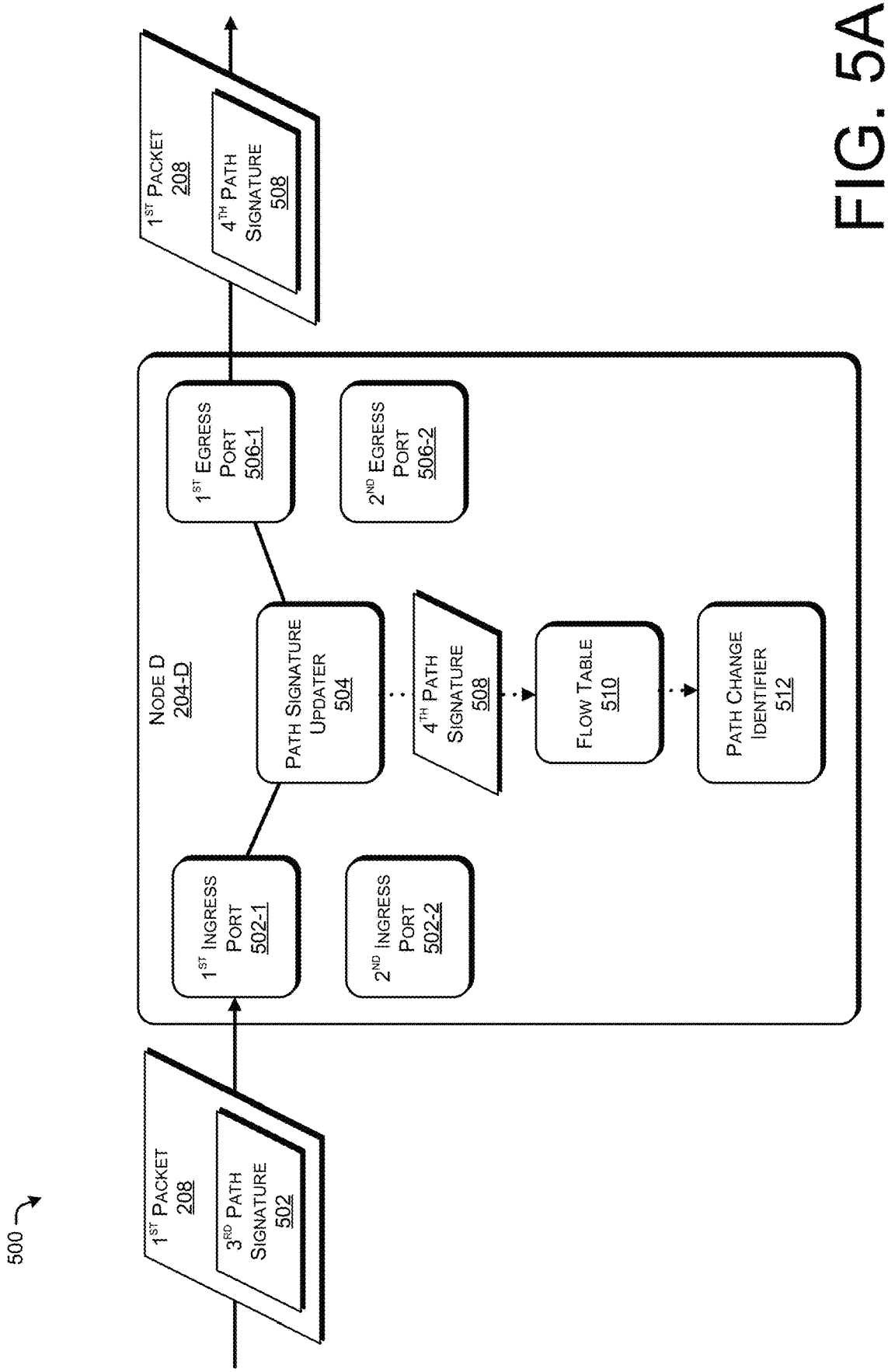
FIGS. 5A and 5B illustrate example environments of a node forwarding packets of a flow with revised path signatures.

FIG. 5A illustrates an example environment 500 of a node forwarding the first packet of the flow with a path signature. In particular, FIG. 5A illustrates an example of Node D 204-D forwarding the first packet 208.

As shown in FIG. 5A, Node D 204-D receives the first packet 208 with a third path signature 502. In some implementations, in which no node between Node A 204-A and Node D 204-D in the path of the first packet 208 has changed or updated the Path Signature field in the first packet 208, the third path signature 502 may be the first path signature 408 generated by Node A 204-A. In certain implementations in which the Path Signature field has been updated between Node A 204-A and Node D 204-D, the third path signature 502 may be based on the first path signature 408 generated by Node A 204-A for the first packet 208.

Node D 204-D may receive the first packet 208 with the third path signature 502 at a first ingress port 502-1, which may be connected to another node in the same network as Node D 204-D (i.e., Node B 204-B). In particular implementations, Node D 204-D includes multiple ingress ports, such as the first ingress port 502-1 and the second ingress port 502-2. Each one of the ingress ports in Node D 204-D (i.e., each of the first ingress port 502-1 and the second ingress port 502-2) may be associated with a unique identifier that distinguishes the ingress port from the other ingress ports in Node D 204-D.

In the example illustrated in FIG. 5A, a path signature updater 504 intercepts the first packet 208. The path signature updater 504, or some other component of Node D 204-D, selects an appropriate egress port among a first egress port 506-1 and a second egress port 506-2. Each one of the egress ports in Node D 204-D (i.e., each of the first egress port 506-1 and the second egress port 506-2) may be associated with a unique identifier that distinguishes the egress port from the other egress ports in Node A 204-A. In the example of FIG. 5A, the first egress port 506-1 has been selected.

Based on various information, such as at least one of an identifier of the first ingress port 502-1 at which the first packet 208 is received, an identifier of the first egress port 508-1 at which the first packet 508 will be forwarded, an identifier of Node D 204-D itself, or the like, the path signature updater 504 generates a fourth path signature 508 for the first packet 208. Further, the path signature updater 504 may generate the fourth path signature 508 using a recursive function that is based, at least in part, on the third path signature 502 in the first packet 208 as-received by Node D 204-D.

In particular implementations, the path signature updater 504 uses a hash function to generate the fourth path signature 508 based on the third path signature 502. The hash function may return a unique value in response to a unique input. Accordingly, as long as the input to the hash function is indicative of the unique path of a particular packet through a network, the hash function will return a value unique to the path. In some examples, the hash function used by the path signature updater 404 is a cryptographic hash function, an XOR function, CRC32, or the like. In particular implementations, the hash function utilized by the path signature updater 504 in Node D 204-D may be different than the hash function utilized by the path signature updater 404 in Node A 204-A. In some instances, the path signature updater 504 can use the following Formula 8 to generate the fourth path signature 508:

$$S_n = \text{Hash}(S_{n-1}, P_i, P_e, N_1) \quad \text{Formula 8}$$

wherein $S_n$ is the new path signature (e.g., the fourth path signature 508), Hash( ) is a hash function, $S_n$ is the previous path signature (e.g., the third path signature 502), $P_i$ is the identifier of the ingress port at which the first packet (e.g., the identifier of the first ingress port 502-1), $P_e$ is the identifier of the egress port at which the packet is forwarded (e.g., the identifier of the first egress port 506-1), and $N_1$ is the identifier of the node (e.g., the identifier of Node D 204-D). According to some examples, the path signature updater 504 may use the following Formula 9 to generate the fourth path signature 508:

$$S_n = \text{Hash}(S_{n-1}, P_i, N_1) \quad \text{Formula 9}$$

wherein $S_n$ is the new path signature (e.g., the fourth path signature 508), Hash( ) is a hash function, $S_n$ is the previous path signature (e.g., the third path signature 502), $P_i$ is the identifier of the ingress port at which the first packet (e.g., the identifier of the first ingress port 502-1), and $N_1$ is the identifier of the node (e.g., the identifier of Node D 204-D). According to some examples, the path signature updater 504 may use the following Formula 10 to generate the fourth path signature 508:

$$S_n = \text{Hash}(S_{n-1}, N_1) \quad \text{Formula 10}$$

wherein $S_n$ is the new path signature (e.g., the fourth path signature 508), Hash( ) is a hash function, $S_n$ is the previous path signature (e.g., the third path signature 502), and $N_1$ is the identifier of the node (e.g., the identifier of Node D 204-D).

Regardless of the formula used by the path signature updater 504, the fourth path signature 508 may uniquely represent the path of the first packet 208 from the source of the first packet 208 to Node D 204-D.

The path signature updater 504 may replace the third path signature 502 with the fourth path signature 508 in the first packet 208. In some examples, the path signature updater 504 deletes the third path signature 502 and adds the fourth path signature 508 to a header of the first packet 208. For instance, the path signature updater 504 may delete the third path signature 502 from a Path Signature field into the first packet 208 and populate the Path Signature field with the fourth path signature 508. In some cases, the Path Signature field is included in a header field (e.g., an IP header, an IPv4 option, an IPv6 extension header, an NSH header, a Geneve header, a VXLAN-GPE header, an SRv6 header, or an MPLS header) and/or included in a payload (e.g., as identified by an EtherType). In some examples, the Path Signature field is included in at least one of IOAM, INT, IFA, or IFIT metadata. According to particular implementations, the Path Signature field has a fixed size. For instance, the Path Signature field has a fixed size of 32 bits, 64 bits, or the like. Accordingly, the fourth path signature 508 may have the same size as the third path signature 502. In various implementations, every path signature generated by the path signature updater 504 (e.g., the fourth path signature 508) will have the same fixed size as the Path Signature field in the first packet 208.

The path signature updater 504 may further forward the first packet 208, with the fourth path signature 508, through the first egress port 506-1. The first egress port 506-1 may be connected to an interface connected to another node. For instance, as illustrated in FIG. 2, the first packet 208 can be forwarded to the destination 206 from the first egress port 506-1.

As illustrated in FIG. 5A, the path signature updater 504 further stores the fourth path signature 508 in a flow table 510. In some cases, the flow table 510 includes multiple entries corresponding to different packets received and forwarded by Node D 204-D. For instance, the flow table 510 may include an entry corresponding to the first packet 208 that includes the fourth path signature 508. In some cases, the entry may further include the third path signature 502. In particular implementations, the entries also identify the flows of the different packets received and forwarded by Node D 204-D. For example, the entry in the flow table 510 corresponding to the first packet 208 may also include information identifying the flow that includes the first packet 208.

Node D 204-D further includes a path change identifier 512, in various implementations. The path change identifier 512 may be configured to access the flow table 510 in order to determine whether packets in a particular flow have different paths. In some examples, the path change identifier 512 may determine that the fourth path signature 508 corresponds to the initial path signature generated by the path signature updater 504 for the flow and may therefore assume that no path change has occurred for the flow. In some instances, the path change identifier 512 may determine that the fourth path signature 508 matches a previous path signature generated by the path signature updater 504 for the flow and may therefore assume that no path change has occurred for the flow. When the path change identifier 512 determines that no path change has occurred, the path change identifier 512 may refrain from generating an alert.

Figure 5B:
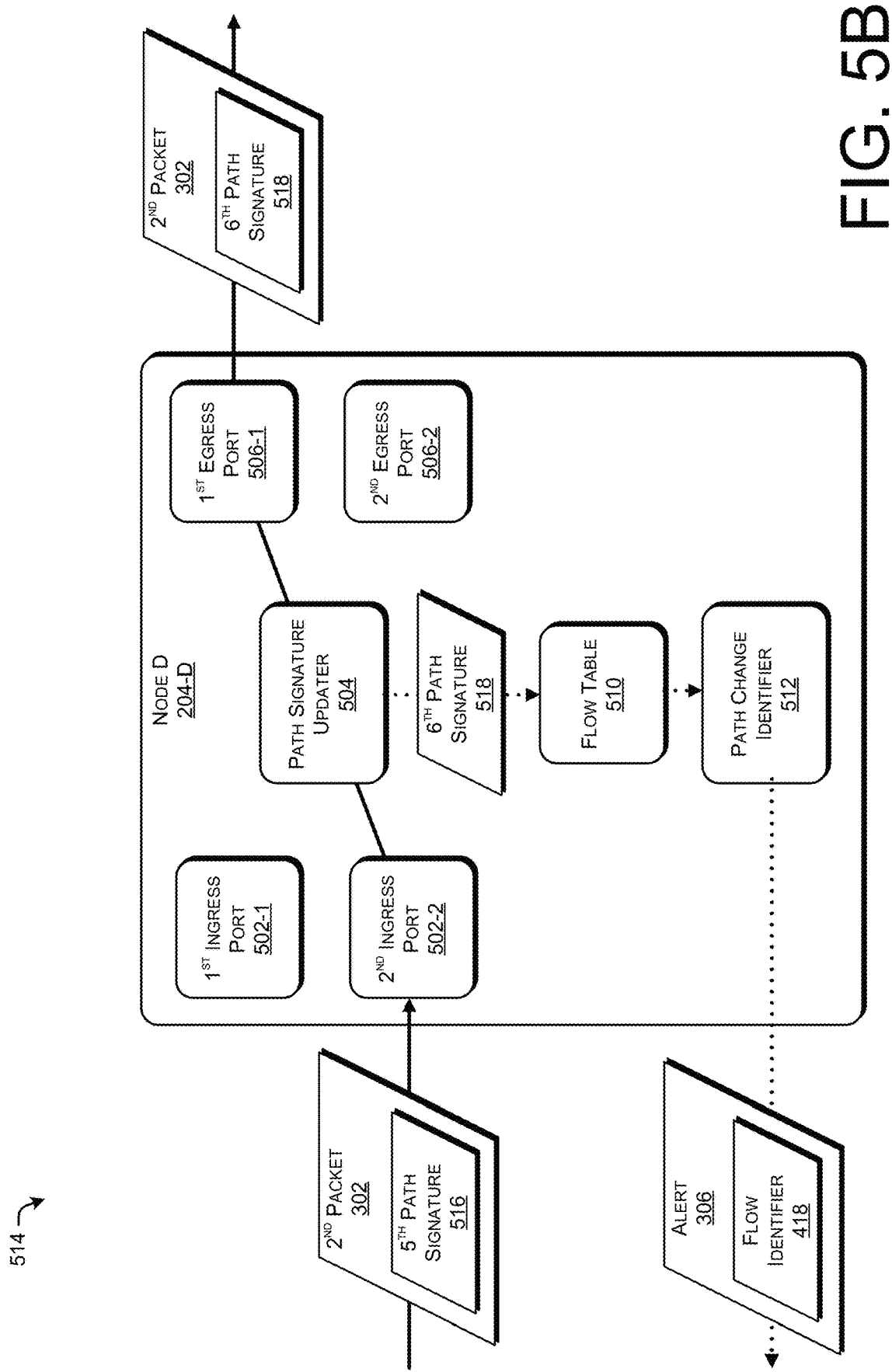

FIG. 5B illustrates an example environment 514 of a node forwarding another packet of the flow with a path signature. In particular, FIG. 5B illustrates an example of Node D 204-D forwarding the second packet 302.

As shown in FIG. 5B, Node D 204-D receives the second packet 302 with a fifth path signature 516. In some implementations, in which no node between Node A 204-A and Node D 204-D in the path of the second packet 302 has changed or updated the Path Signature field in the second packet 302, the fifth path signature 516 may be the second path signature 416 generated by Node A 204-A. In certain implementations in which the Path Signature field has been updated between Node A 204-A and Node D 204-D, the fifth path signature 516 may be based on the second path signature 416 generated by Node A 204-A for the first packet 208.

Node D 204-D receives the second packet 302 at the second ingress port 502-2, rather than the first ingress port 502-1 at which the first packet 208 was received. This indicates that the second packet 302 has traveled a different path before arriving at Node D 204-D than a path traveled by the first packet 208. The path signature updater 504 intercepts the second packet 302. Node D 204-D may further select the first egress port 506-1 from which to forward the second packet 302 toward its destination.

Based on various information, such as at least one of an identifier of the second ingress port 502-2 at which the second packet 302 is received, an identifier of the first egress port 508-1 at which the second packet 302 will be forwarded, an identifier of Node D 204-D itself, or the like, the path signature updater 504 generates a sixth path signature 518 for the second packet 302.

In various implementations, the path signature updater 504 may generate the sixth path signature 518 based on the previous, fifth path signature 516 in the as-received second packet 302. In some examples, the path signature updater 404 uses at least one of Formulas 8-10 to generate the fourth path signature 508 and the sixth path signature 518. Based at least in part on a difference between the third path signature 502 and the fifth path signature 516, and/or a difference between the first ingress port 502-1 at which the first packet 208 is received and the second ingress port 502-2 at which the second packet 302 is received, the sixth path signature 516 may be different than the third path signature 502.

The path signature updater 504 may replace the fifth path signature 516 with the sixth path signature 518 in the second packet 302. In some examples, the path signature updater 504 deletes the fifth path signature 516 and adds the sixth path signature 518 to a header of the second packet 302. For instance, the path signature updater 504 may delete the fifth path signature 516 from a Path Signature field into the second packet 302 and populate the Path Signature field with the sixth path signature 518. In some cases, the Path Signature field is included in a header field (e.g., an IP header, an IPv4 option, an IPv6 extension header, an NSH header, a Geneve header, a VXLAN-GPE header, an SRv6 header, or an MPLS header) and/or included in a payload (e.g., as identified by an EtherType). In some examples, the Path Signature field is included in at least one of IOAM, INT, IFA, or IFIT metadata. The Path Signature field may have a fixed size. Accordingly, the sixth path signature 518 may have the same size as the fifth path signature 516. The path signature updater 504 may further forward the second packet 302, with the sixth path signature 518, through the first egress port 506-1.

As illustrated in FIG. 5B, the path signature updater 504 further stores the sixth path signature 518 in the flow table 410. In some cases, the flow table 510 may already have stored a first entry corresponding to the first packet 208 that includes the fourth path signature 508. In some cases, the first entry may also include the third path signature 502. The flow table 510 may further store a second entry corresponding to the second packet 302 that includes the sixth path signature 518. The second entry may also include the fifth path signature 516, in some example. In some cases, the first and second entries corresponding to the first packet 208 and the second packet 302 may also include information identifying the flow that includes the first packet 208 and the second packet 302.

The path change identifier 512 may determine that the sixth path signature 518 stored in the second entry of the flow table 510, is different than the fourth path signature 508, which is stored in the first entry of the flow table 510. Based on this difference, the path change identifier 512 may determine that there is a path change in the flow. In response to determining that there is the path change, the path change identifier 512 may generate and transmit the alert 306 from Node D 204-D. The alert 306 may indicate the path change in the flow. As illustrated in the example of FIG. 5B, the alert 306 includes the flow identifier 418. In examples in which the alert 306 is transmitted to a collector (e.g., the collector 308), the flow identifier 518 may be used to identify a problem in the network that has led to the path change.

FIG. 6A illustrates an example of a flow table 600 with various entries corresponding to different flows through a particular node. In some examples, the flow table 600 can be used as the flow table 410 described above with reference to FIGS. 4A and 4B or the flow table 510 described above with reference to FIGS. 5A and 5B. In various implementations, the flow table 600 may be managed by a node receiving and forwarding multiple packets in multiple flows.

The flow table 600 includes multiple entries. Each one of the entries includes multiple fields. As illustrated in FIG. 6A, the fields include an entry number, a flow identifier, a count, a last packet time, and a path signature. In various implementations, the entries can include fewer or additional fields.

In some cases, the flow table 600 includes a fixed number of entries associated with a fixed number of flow identifiers. The fixed number may be an integer that is greater than 1. As illustrated in FIG. 6A, the flow table 600 includes ten entries (entry #1-#10). The entries stored in the flow table 600 can correspond to ten flows whose packets have been recently received and forwarded by the node. If more than ten flows include packets that are received and forwarded by the node, only the ten entries corresponding to the ten most recent flows may be stored in the flow table 600. Accordingly, the size of the flow table 600 can be restricted to conserve memory resources at the node.

The flow identifier field of an entry corresponding to a packet may indicate the flow corresponding to the entry. In some cases, the flow identifier field can include at least one of an ingress interface (e.g., SNMP ifIndex), source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)) associated with the flow. In certain implementations, the flow identifier field can be a string that can be used to identify the flow.

The count field of an entry corresponding to a flow may correspond to the number of packets received and/or forwarded in the flow by the node. In some cases, the count field may correspond to the number of packets of the flow that have been received and/or forwarded with a particular signature without the flow having experienced a path change. For example, "Count 1" may correspond to the number of packets received by the node with "Flow Identifier 1." In some cases, "Count 1" may correspond to the number of packets with "Signature 1" that have been received since either the beginning of the flow, or the last path change of the flow.

The time field of an entry corresponding to a flow may indicate a time at which the most recent packet of the flow is received by the node, a time at which the most recent packet of the flow is forwarded by the node, or a combination thereof.

The path signature field of an entry corresponding to a flow may include the path signature generated by the node for a packet of that flow. In some cases, the path signature field may further include a previous path signature that was received by the node for that flow.

In particular implementations, the path signature field can be used to identify whether the flow is associated with a path change. For instance, in the example illustrated in FIG. 6A, "Signature 1," corresponding to "Flow Identifier 1," may be set as "Signature A." When the node receives a packet corresponding to "Flow Identifier 1" that includes a signature different than "Signature A, the node may identify a path change in the flow with "Flow Identifier 1." Accordingly, the node may generate and transmit an alert corresponding to "Flow Identifier 1."

FIG. 6B illustrates an example of a flow table 602 illustrating a path change in a particular data flow. For instance, the flow table 602 can correspond to "Entry #1" in the flow table 600 described above with reference to FIG. 6A.

As illustrated, the flow table 602 can correspond to a single flow identifier, such as "Flow Identifier 1." The flow table 602 can track individual packets received and/or forwarded by the node in the flow that correspond to "Flow Identifier 1." In some cases, the flow table 602 may track a predetermined number of the most recent packets corresponding to "Flow Identifier 1," such as the most recent ten packets received and/or forwarded in the flow corresponding to "Flow Identifier 1."

Each of the individual packets may have its own timestamp (e.g., one of "Timestamp A" to "Timestamp J"). In some cases, a given timestamp may correspond to a time at which the individual packet was received by the node and/or a time at which the node forwarded the individual packet in the flow. With reference to FIG. 6A, "Timestamp 1" can be the most recent one of "Timestamp A" to "Timestamp J."

The flow table 602 may also track the path signatures of the individual packets. A given path signature in the flow table 602 can correspond to the path signature in the packet as-received and/or the path signature in the packet as-forwarded by the node. For instance, five packets in the flow corresponding to "Flow Identifier 1" can have a path signature of "Signature A," and five packets in the flow can have a path signature of "Signature B." With reference to FIG. 6A, "Signature 1" can be the most recent path signature observed in Flow Identifier 1 (e.g., either "Signature A" or "Signature B").

The flow table 602 can be utilized to identify a path change in the flow corresponding to "Flow Identifier 1." Assuming that flow table 602 is arranged in chronological order, wherein "Timestamp J" is the most recent timestamp, a path change can be observed between "Timestamp E" and "Timestamp F," wherein, packets of the flow change from "Signature A" to "Signature B." Accordingly, the path change in the flow can be efficiently identified.

Figure 7A:
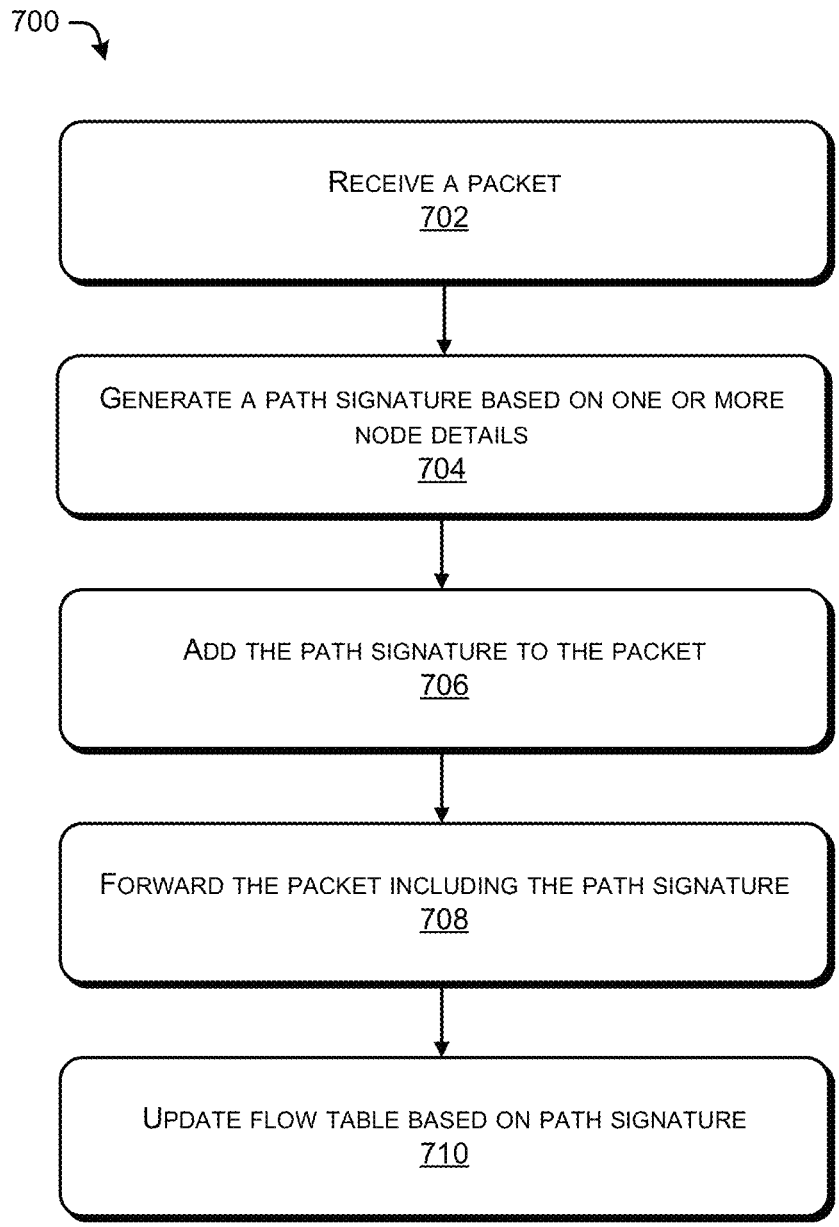
FIG. 7A illustrates an example process for adding a path signature to a data packet.
Figure 7B:
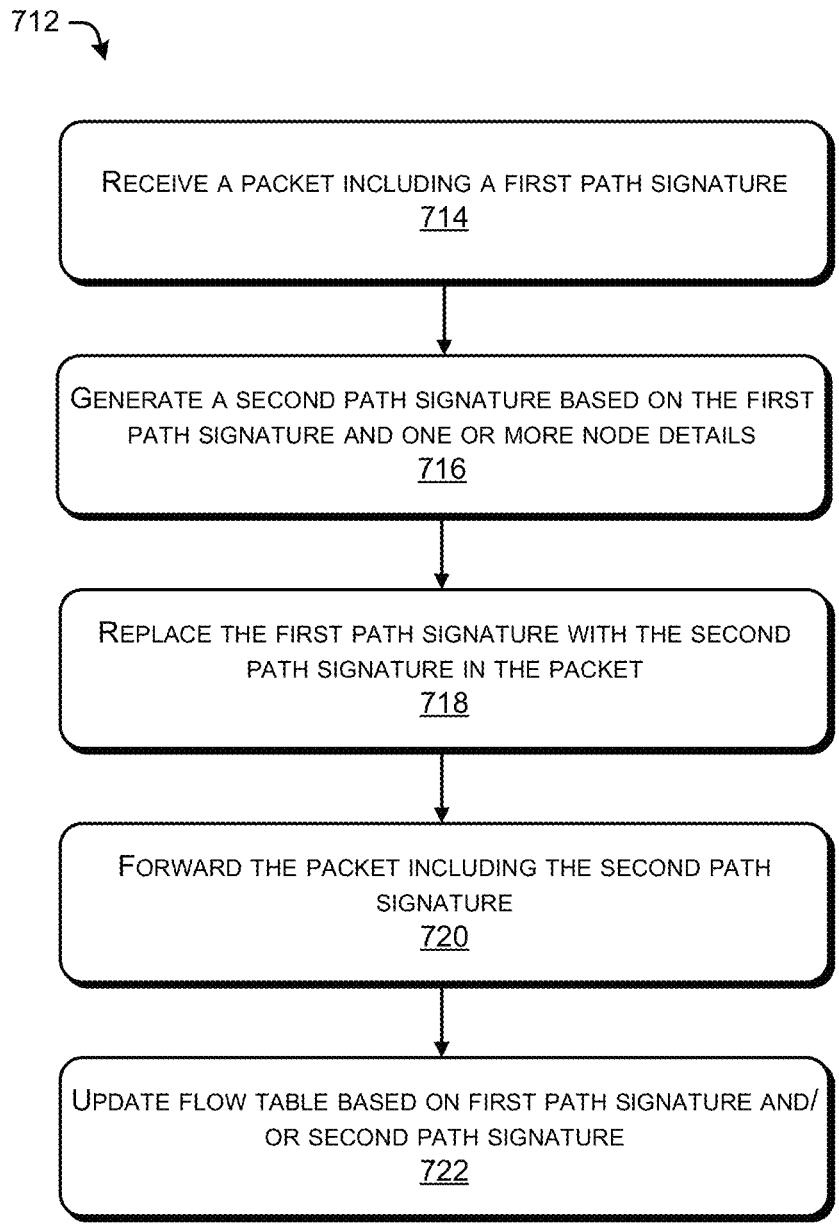
FIG. 7B illustrates an example process for updating a path signature of a data packet.

FIGS. 7A and 7B illustrates example processes 700 and 712 for updating a path signature of a data packet. In some example implementations, the process 700 and/or the process 712 is performed by a network node, such as first node 110 or network node 118 described above with reference to FIG. 1, or any of Nodes A to D 204-A to 204-D described above with reference to FIGS. 2-5B.

Process 700 may be performed by a node receiving a data packet without an existing path signature. At 702, a packet is received. The packet may be part of a flow through a network from a source to a destination. In some cases, the as-received packet may omit a path signature.

At 704, a path signature based on one or more node details is generated. The one or more node details can include at least one of an identifier of the particular ingress port at which the packet is received, an identifier of an egress port at which the packet will be forwarded from, an identifier of the node at which the packet is received, or the like. In various implementations, the path signature can be generated using a hash function. For instance, any one of Formulas 1 to 3 or 5 to 7 described above can be used to generate the path signature. In some implementations, the path signature may have a limited size, such as 32 bits, 64 bits, or the like.

At 706, the path signature is added to the packet. In some cases, the path signature is populated in a data field in a header (e.g., an IP header, an IPv4 option, an IPv6 extension header, an NSH header, a Geneve header, a VXLAN-GPE header, an SRv6 header, or an MPLS header) and/or a payload (e.g., as identified by an EtherType) of the packet. In some examples, the data field is included in at least one of IOAM, INT, IFA, or IFIT metadata within the packet. The data field may have a fixed size corresponding to the length of the path signature.

At 708, the packet is forwarded with the path signature. In various implementations, the packet is forwarded from a selected egress port. The egress port can be selected based on at least one of the destination of the packet, a load associated with a node affiliated with the egress port, a load associated with a node attached to another egress port, or the like. For instance, the header of the packet may indicate the destination of the packet, and the egress port can be selected to forward the packet in the direction of the destination. In some cases, a load balancing functionality can be used to select an egress port attached to at least one node in the network that is relatively uncongested.

At 710, a flow table is updated based on the path signature. In some cases, an entry of the flow table can be generated to include the path signature and at least one of an identifier of the flow, a timestamp at which the packet was received, a timestamp at which the packet was forwarded, or the like. In various examples, the path signature generated in the process 700 can be the same path signature utilized in a previous packet of the same flow. According to various implementations, an existing entry in the flow table corresponding to the path signature may be identified and updated at 710. For instance, the entry may include at least one of a count corresponding to the number of packets of the flow with the path signature or a last packet time corresponding to a timestamp of the most recent packet with the path signature. The count and/or the last packet time may be updated based on the packet that is received, updated, and forwarded in process 700.

Although not illustrated in FIG. 7A, the entity performing process 700 may additionally identify a path change of the flow based on the flow table. For instance, by adding a new entry to the flow table corresponding to a new path signature that does not otherwise appear in the flow table, the path change may be identified. In some cases, the entity performing process 700 may identify that more than a threshold number of packets with one or more path signatures in the flow have been received and/or forwarded, and may therefore identify that a path change has occurred. In some cases, the entity may generate and transmit an alert that identifies the path change.

Process 712 may be performed by a node receiving a data path with an existing path signature. At 714, a packet including a first path signature received. The packet may be part of a flow through a network from a source to a destination. In some cases, the first path signature may have been added to the packet and/or generated by a previous node in the network.

At 716, a second path signature based on the first path signature and one or more node details is generated. The one or more node details can include at least one of an identifier of the particular ingress port at which the packet is received, an identifier of an egress port at which the packet will be forwarded from, an identifier of the node at which the packet is received, or the like. In various implementations, the path signature can be generated using a hash function. For instance, any one of Formulas 8 to 10 described above can be used to generate the path signature. In some implementations, the path signature may have a limited size, such as 32 bits, 64 bits, or the like. The second path signature may have the same size as the first path signature.

At 718, the first path signature is replaced with the second path signature in the packet. In some cases, the first path signature is deleted from, and the second path signature is populated in, a data field in a header field (e.g., an IP header, an IPv4 option, an IPv6 extension header, an NSH header, a Geneve header, a VXLAN-GPE header, an SRv6 header, or an MPLS header) and/or in a payload (e.g., as identified by an EtherType) of the packet. In some examples, the data field is included in at least one of IOAM, INT, IFA, or IFIT metadata within the packet. The data field may have a fixed size corresponding to the length of the path signature.

At 720, the packet is forwarded with the second path signature. In various implementations, the packet is forwarded from a selected egress port. The egress port can be selected based on at least one of the destination of the packet, a load associated with a node affiliated with the egress port, a load associated with a node attached to another egress port, or the like. For instance, the header of the packet may indicate the destination of the packet, and the egress port can be selected to forward the packet in the direction of the destination. In some cases, a load balancing functionality can be used to select an egress port attached to at least one node in the network that is relatively uncongested.

At 722, a flow table is updated based on the first path signature and/or the second path signature. In some cases, an entry of the flow table can be generated to include the first path signature and/or the second path signature and at least one of an identifier of the flow, a timestamp at which the packet was received, a timestamp at which the packet was forwarded, or the like. In various examples, the first path signature and/or the second path signature can be the same path signature utilized in a previous packet of the same flow. According to various implementations, an existing entry in the flow table corresponding to first path signature and/or the second path signature may be identified and updated at 722. For instance, the entry may include at least one of a count corresponding to the number of packets of the flow with first path signature and/or the second path signature or a last packet time corresponding to a timestamp of the most recent packet with the first path signature and/or the second path signature. The count and/or the last packet time may be updated based on the packet that is received, updated, and forwarded in process 712.

Although not illustrated in FIG. 7B, the entity performing process 712 may additionally identify a path change of the flow based on the flow table. For instance, by adding a new entry to the flow table corresponding to a new path signature (e.g., the first path signature and/or the second path signature) that does not otherwise appear in the flow table, the path change may be identified. In some cases, the entity performing process 712 may identify that more than a threshold number of packets with one or more path signatures in the flow have been received and/or forwarded, and may therefore identify that a path change has occurred. In some cases, the entity may generate and transmit an alert that identifies the path change.

Figure 8:
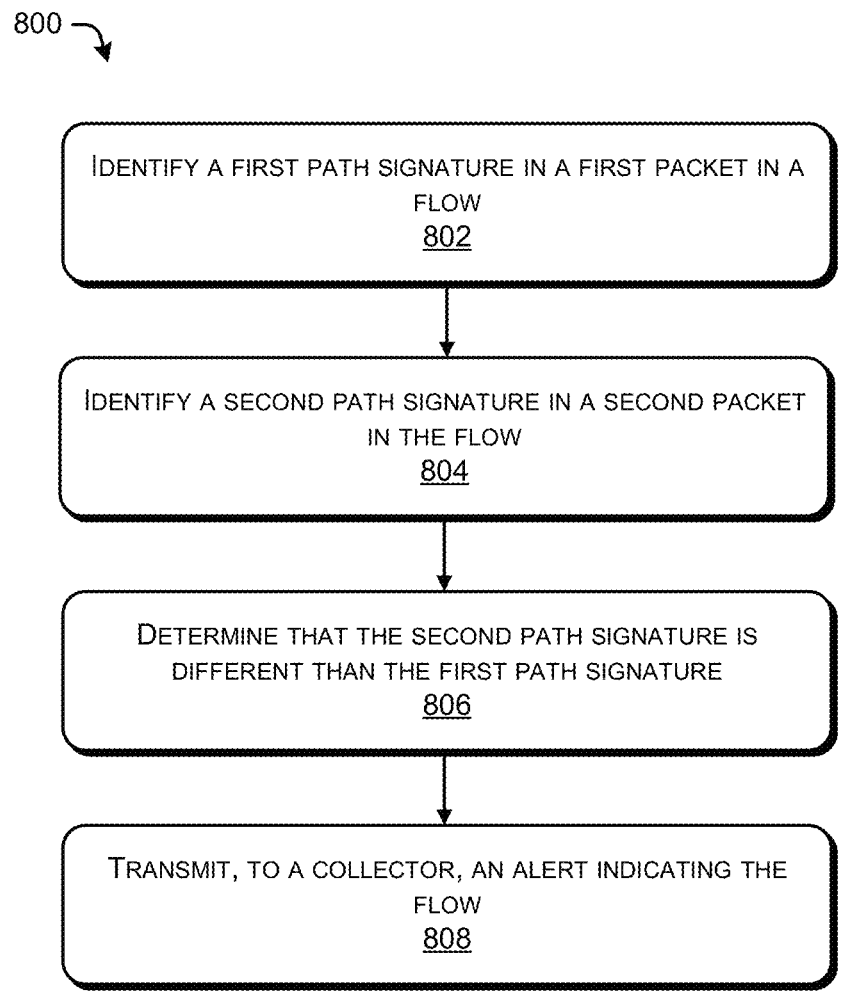
FIG. 8 illustrates an example process for transmitting an alert based on data packets with different path signatures.

FIG. 8 illustrates an example process 800 for transmitting an alert based on data packets with different path signatures. In some example implementations, the process 800 is performed by a network node, such as first node 110 or network node 118 described above with reference to FIG. 1, or any of Nodes A to D 204-A to 204-D described above with reference to FIGS. 2-5B.

At 802, a first path signature of a first packet in a flow is identified. In some implementations, the first path signature is in the first packet as-received from a previous node in the network. In some cases, the first path signature is in the first packet as-forwarded to a next node in the network. According to particular implementations, the first path signature may be generated by the device performing the process 800.

At 804, a second path signature of a second packet in the flow is identified. In some cases, the second path signature may originate from the same source as the first path signature. For instance, if the first path signature is generated by the node performing the process 800, the second path signature is also generated by the node performing the process 800. In various implementations, the second path signature may have an equivalent size to the first path signature. For instance, the first and second path signatures may each have a size of 32 bits, 64 bits, or the like.

At 806, the first path signature is determined to be different than the second path signature. In some cases, the first path signature and the second path signature are stored in local memory, such as in a flow table. Accordingly, the first path signature and the second path signature can be compared even after one or both of the first and second packets has been forwarded to another node in the network. In some cases, the entity performing the process 800 may additionally determine that a number of packets in the flow with the first path signature and/or a number of packets in the flow with the second path signature exceeds a predetermined threshold. In various implementations, the first path signature and the second path signature can be compared before, as, or immediately after the first and second packets have been forwarded.

At 808, an alert indicating the flow is transmitted to a collector. The collector may be a separate device that can receive other alerts from other nodes in the network. In various implementations, the alert may be a data packet that includes a flow indicator in a payload. The flow indicator can include at least one of a least one element of a 5-tuple associated with the flow, such as a source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)) of the first packet and the second packet. In some cases, the alert may also indicate the device performing the process 800. For instance, the alert may include a node identifier (e.g., an IP address) in a header or the payload.

Figure 9:
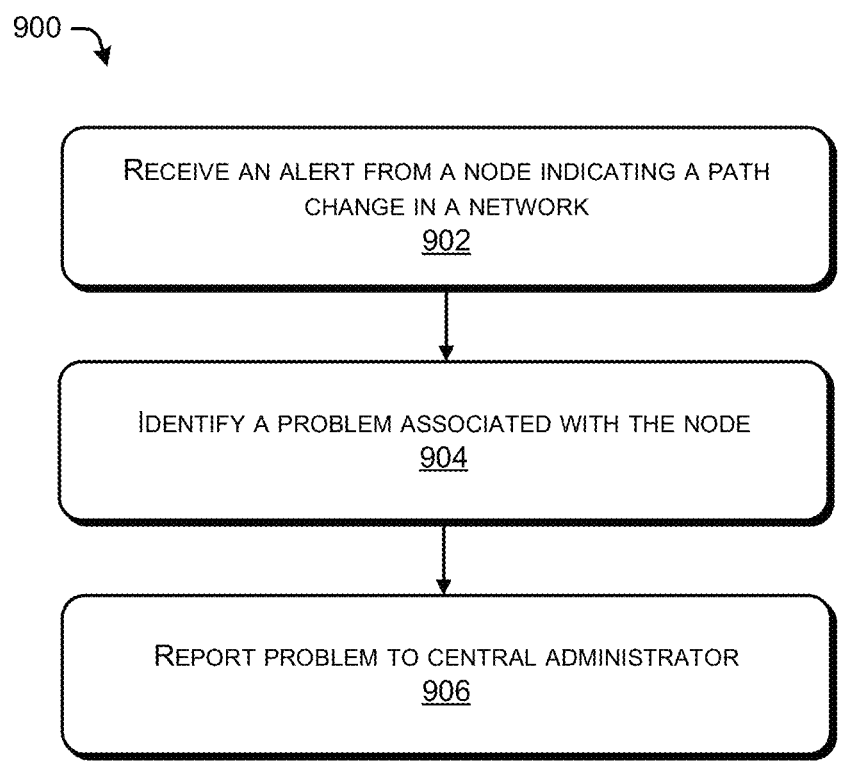
FIG. 9 illustrates an example process for reporting a problem to a central administrator based on a path change.

FIG. 9 illustrates an example process 900 for reporting a problem to a central administrator based on a path change. In some example implementations, the process 900 is performed by a collector, such as the collector 124 described above with reference to FIG. 1 or the collector 308 described above with reference to FIG. 3.

At 902, an alert is received from a node. The alert may indicate a path change in a network to which the node belongs. In various implementations, the alert may be a data packet that includes a flow indicator in a payload. The flow indicator can include at least one of a least one element of a 5-tuple associated with the flow, such as a source (e.g., from the same IP address), destination (e.g., directed to the same IP address), protocol (e.g., IP protocol), source port (e.g., for UDP or TCP), destination port (e.g., for UDP, TCP, or ICMP), or type of service (e.g., IP Type of Service (ToS)) of the first packet and the second packet. In some cases, the alert may also indicate the node itself. For instance, the alert may include a node identifier (e.g., an IP address) in a header or the payload.

At 904, a problem associated with the node is identified. In some cases, another alert may be received from another node that is downstream of the node from which the alert is received at 902. The path change at the downstream node may be determined to have originated at the node from which the alert is received at 902. In some cases, the problem may be a problem associated with an interface between the node and a downstream node. For instance, the node may determine to forward a first packet in the flow to the downstream node, then determine that the interface has been interrupted, and may then determine to forward a second packet in the flow to a different node in the network. In some cases, the problem may be a problem associated with congestion in the network. For instance, the node may determine to forward a first packet in the flow to a downstream node, may determine that the downstream node is congested, and may then decide to forward a second packet in the flow to a different downstream node.

At 906, the problem is reported to a central administrator. In some cases, the central administrator may initiate a process by which the problem can be solved. In various implementations, the central administrator can be a device that can output an alert to an individual or system that can address the problem. For instance, the central administrator my dispatch an individual to correct the problem in the network.

Figure 10:
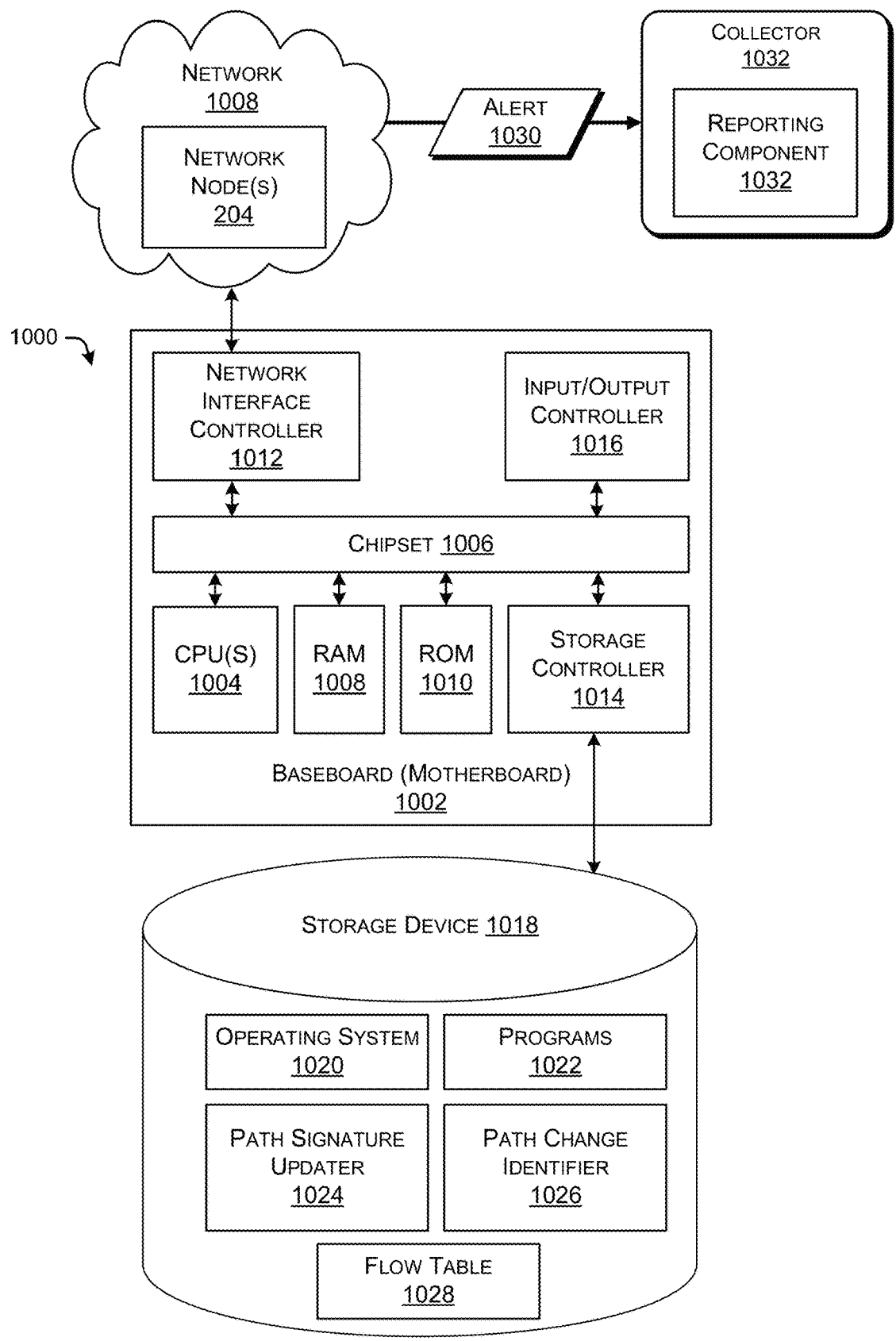
FIG. 10 shows an example computer architecture for a computer capable of executing program components for implementing the functionality described herein.

FIG. 10 shows an example computer architecture for a server computer 1000 capable of executing program components for implementing the functionality described above.

The computer architecture shown in FIG. 10 illustrates a conventional server computer, workstation, desktop computer, laptop, tablet, network appliance, e-reader, smartphone, or other computing device, and can be utilized to execute any of the software components presented herein. The server computer 1000 may, in some examples, correspond to a network node 204 described herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1008. The chipset 1006 can include functionality for providing network connectivity through a Network Interface Controller (NIC) 1012, such as a gigabit Ethernet adapter. The NIC 1012 is capable of connecting the computer 1000 to other computing devices over the network 1008. It should be appreciated that multiple NICs 1012 can be present in the computer 1000, connecting the computer to other types of networks and remote computer systems. In some instances, the NICs 1012 may include at least on ingress port and/or at least one egress port.

The computer 1000 can be connected to a storage device 1018 that provides non-volatile storage for the computer. The storage device 1018 can store an operating system 1020, programs 1022, and data, which have been described in greater detail herein. The storage device 1018 can be connected to the computer 1000 through a storage controller 1014 connected to the chipset 1006. The storage device 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the storage device 1018 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1018 is characterized as primary or secondary storage, and the like.

For example, the computer 1000 can store information to the storage device 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage device 1018 by detecting the physical states or characteristics of one or more particular locations within the physical storage units.

In addition to the mass storage device 1018 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by a network node (e.g., network node 204), source (e.g., 202), destination (e.g., 206), collector (e.g., 308), or central administrator (e.g., 312), may be supported by one or more devices similar to computer 1000. Stated otherwise, some or all of the operations performed by a network node, collector, and/or central administrator, may be performed by one or more computer devices 1000 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1018 can store an operating system 1020 utilized to control the operation of the computer 1000. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1018 can store other system or application programs and data utilized by the computer 1000.

In one embodiment, the storage device 1018 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 1-9. The computer 1000 can also include computer-readable storage media having instructions stored thereupon for performing any of the other computer-implemented operations described herein.

As illustrated in FIG. 10, the storage device 1018 stores a path signature updater 1024, a path change identifier 1026, and a flow table 1028. In some implementations, at least one of the path signature updater 1024, the path change identifier 1026, or the flow table 1028 can be omitted. Using instructions stored in the path signature updater 1024, the CPU(s) 1004 may be configured to generate and update path signatures for individual data packets in a data flow that are traversing the computer 1000. Using instructions stored in the path change identifier 1026, the CPU(s) 1004 may be configured to identify whether a path change has occurred in a data flow by comparing path signatures of different data packets within the data flow. The flow table 1026 may store past one or more path signatures associated with one or more data flows whose data packets are traversing the computer 1000.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, comprising:
   receiving, from a first node and at a second node, a first packet comprising a first value;
   generating a second value by inputting the first value and data associated with the second node into a hash function;
   replacing the first value with the second value in the first packet;
   forwarding, to a third node and by the second node, the first packet comprising the second value;
   receiving, at the second node, a second packet comprising a third value;
   identifying that the third value is different than the first value; and
   based on identifying that the third value is different than the first value, transmitting, by the second node, an alert to a network manager.

2. The method of claim 1, wherein a size of the first value is equivalent to a size of the second value.

3. The method of claim 1, wherein each of the size of the first value and the size of the second value is 32 bits or 64 bits.

4. The method of claim 1, wherein the first value is a first signature and the second value is a second signature.

5. The method of claim 1, wherein replacing the first value with the second value comprises replacing the first value in a data field having a fixed size with the second value, the data field comprising at least one of an In-situ OAM (IOAM) field, an In-Network Telemetry (INT) field, an Inband Flow Analyzer (IFA) field, or an In-situ Flow Information Telemetry (IFIT) field.

6. The method of claim 1, further comprising:
   receiving, at the second node, a third packet comprising a fourth value;
   generating a fifth value by inputting the fourth value and the data associated with the second node into the hash function;
   identifying that the fifth value is different than the second value; and
   based on identifying that the fifth value is different than the second value, transmitting, by the second node, an alert to a network manager.

7. The method of claim 6, wherein the third node identifies that the fifth value is different than the second value.

8. The method of claim 1, wherein a size of the first value is equivalent to a size of the third value.

9. A system, comprising
   at least one processor; and
   memory storing instructions that, when executed by the at least one processor, cause the at least one processor to perform operations comprising:
   receiving, from a first node and at a second node, a first packet comprising a first value;
   generating a second value by inputting the first value and data associated with the second node into a hash function;
   replacing the first value with the second value in the first packet;
   forwarding, to a third node and by the second node, the first packet comprising the second value;
   receiving, at the second node, a second packet comprising a third value;
   generating a fourth value by inputting the third value and the data associated with the second node into the hash function;
   identifying that the fourth value is different than the second value; and
   based on identifying that the fourth value is different than the second value, transmitting, by the second node, an alert to a network manager.

10. The system of claim 9, wherein a size of the first value is equivalent to a size of the second value.

11. The system of claim 9, wherein each of the size of the first value and the size of the second value is 32 bits or 64 bits.

12. The system of claim 9, wherein replacing the first value with the second value comprises replacing the first value in a data field having a fixed size with the second value, the data field comprising at least one of an In-situ OAM (IOAM) field, an In-Network Telemetry (INT) field, an Inband Flow Analyzer (IFA) field, or an In-situ Flow Information Telemetry (IFIT) field.

13. The system of claim 9, wherein the operations further comprise:
   receiving, at the second node, a third packet comprising a fifth value;
   identifying that the fifth value is different than the third value; and
   based on identifying that the fifth value is different than the third value, transmitting, by the second node, an alert to a network manager.

14. The system of claim 9, wherein the third node identifies that the fourth value is different than the second value.

15. The system of claim 9, wherein a size of the first value is equivalent to a size of the third value.

16. A system, comprising:
   a first node comprising:
   at least one processor; and
   memory storing instructions that, when executed by the at least one processor, cause the at least one processor to perform operations comprising:
   receiving, from a second node, a first packet;
   identifying a first value in a first In-situ OAM (IOAM) field of the first packet;
   generating a second value by inputting the first value and data associated with the first node into a hash function, a size of the first value being equivalent to a size of the second value;
   replacing the first value with the second value in the first IOAM field of the first packet;
   based on replacing the first value with the second value, forwarding the first packet to a third node;
   receiving a second packet from the second node;

identifying a third value in a second IOAM field of the second packet;

identifying that the third value is different than the first value; and based on determining that the third value is different than the first value, transmitting an alert to a network manager.

17. The system of claim 16, wherein the at least one processor is at least one first processor, the memory is first memory, the instructions are first instructions, the operations are first operations, and the system further comprises:

the third node comprising:

at least one second processor; and second memory storing second instructions that, when executed by the at least one second processor, cause the at least one second processor to perform second operations comprising:

receiving the first packet comprising the second value from the first node;

receiving a third packet from the first node;

identifying a fourth value in a third IOAM field of the third packet;

identifying that the fourth value is different than the second value; and based on determining that the fourth value is different than the second value, transmitting an alert to a network manager.

* * * * *